US011997250B2

(12) United States Patent
Lee et al.

(10) Patent No.: US 11,997,250 B2
(45) Date of Patent: May 28, 2024

(54) DEVICE FOR PROVIDING AUGMENTED REALITY AND SYSTEM FOR PROVIDING AUGMENTED REALITY USING THE SAME

(71) Applicant: Samsung Display Co., LTD., Yongin-si (KR)

(72) Inventors: Tae Hee Lee, Hwaseong-si (KR); Min Woo Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 51 days.

(21) Appl. No.: 17/841,422

(22) Filed: Jun. 15, 2022

(65) Prior Publication Data
US 2023/0127028 A1  Apr. 27, 2023

(30) Foreign Application Priority Data

Oct. 21, 2021 (KR) ............. 10-2021-0140662

(51) Int. Cl.
*H04N 13/383* (2018.01)
*G06T 19/00* (2011.01)
*G06V 20/20* (2022.01)

(52) U.S. Cl.
CPC ......... *H04N 13/383* (2018.05); *G06T 19/006* (2013.01); *G06V 20/20* (2022.01)

(58) Field of Classification Search
CPC ....... H04N 13/383; G06T 19/006; G06T 7/11; G06T 19/20; G06V 20/20; G06V 40/18; G06F 3/013; G06F 3/017; G06F 3/011; G02B 27/0172; G02B 27/0093; G02B 2027/014; G02B 2027/0141; G02B 2027/0178; H05B 33/12
See application file for complete search history.

(56) References Cited

U.S. PATENT DOCUMENTS

| 11,106,915 B1 * | 8/2021 | Nagar ............... G06F 16/29 |
| 2015/0254069 A1 * | 9/2015 | Ito ................. G06F 13/00 717/174 |

(Continued)

FOREIGN PATENT DOCUMENTS

| CN | 106774912 A | 5/2017 |
| KR | 10-2013-0015488 A | 2/2013 |

(Continued)

*Primary Examiner* — Jitesh Patel
(74) *Attorney, Agent, or Firm* — Lewis Roca Rothgerber Christie LLP

(57) ABSTRACT

A device for providing augmented reality (AR) that can accurately detect an object or a text at which a user gazes, and can display an image associated with the detected object or text, and a system for providing AR using the same, and may include at least one display module configured to display an AR content image through a transparent lens, a sensing module configured to generate signals indicative of movement in left, right, up, and down directions, and to generate image data corresponding to a user's gaze direction, a biosensor configured to detect a user's pupil to output a pupil sensing signal, and a control module configured to detect gaze coordinate information based on the pupil sensing signal, and to extract an object or a text corresponding to the gaze coordinate information from the image data to generate AR content data including the extracted object or text.

20 Claims, 19 Drawing Sheets

(56) References Cited

U.S. PATENT DOCUMENTS

| | | | |
|---|---|---|---|
| 2016/0188585 A1* | 6/2016 | Durham | H04L 12/1827 |
| | | | 345/633 |
| 2016/0359121 A1* | 12/2016 | Ito | H10K 85/342 |
| 2017/0092002 A1* | 3/2017 | Mullins | G02B 27/0172 |
| 2017/0195658 A1* | 7/2017 | Jung | G09G 3/3233 |
| 2017/0309698 A1 | 10/2017 | Bower et al. | |
| 2018/0005563 A1* | 1/2018 | Lee | G09G 3/2092 |
| 2018/0307044 A1* | 10/2018 | Oh | H10K 59/122 |
| 2020/0358018 A1* | 11/2020 | Kim | H10K 59/32 |
| 2021/0174602 A1* | 6/2021 | Yoo | G06T 19/006 |
| 2023/0008009 A1* | 1/2023 | Nicholson | G06F 3/013 |

FOREIGN PATENT DOCUMENTS

| | | |
|---|---|---|
| KR | 10-2018-0118488 A | 10/2018 |
| KR | 10-2098277 B1 | 4/2020 |

* cited by examiner

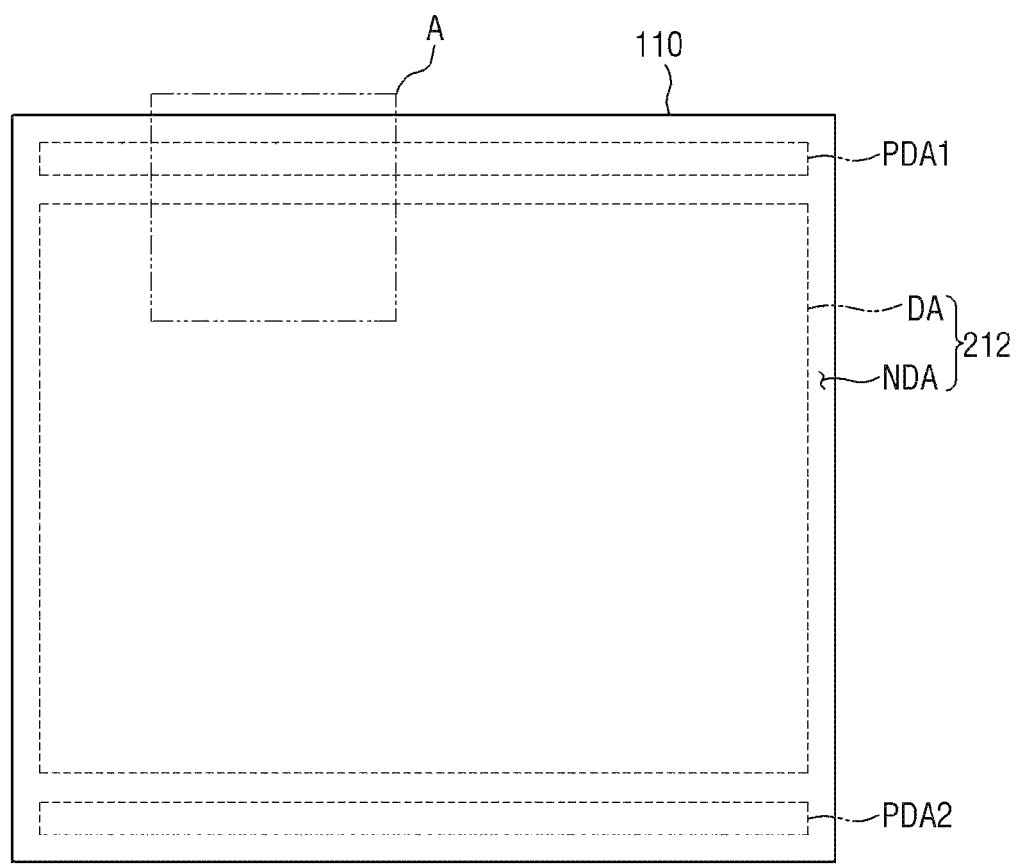
FIG. 6
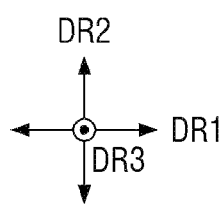

Dn(Bx, By)

DEVICE FOR PROVIDING AUGMENTED REALITY AND SYSTEM FOR PROVIDING AUGMENTED REALITY USING THE SAME

CROSS-REFERENCE TO RELATED APPLICATION

This application claims priority to, and the benefit of, Korean Patent Application No. 10-2021-0140662 filed on Oct. 21, 2021 in the Korean Intellectual Property Office, the contents of which in its entirety are herein incorporated by reference.

BACKGROUND

1. Field

The present disclosure relates to a device for providing augmented reality and a system for providing augmented reality using the same.

2. Description of the Related Art

Recently, as electronic devices and display devices capable of realizing virtual reality (VR) have been developed, such devices are attracting more and more attention. As the next step of virtual reality, a technology capable of realizing augmented reality (AR) and mixed reality (MR) is being studied.

Unlike the virtual reality that creates a completely virtual world, augmented reality is a display technology that further increases the effect of reality by superimposing virtual objects or image information over the environment of the real world.

While applications of virtual reality previously have been limited only to fields such as games and virtual experiences, augmented reality advantageously finds a variety of applications that can be applied to the real environment in various ways. For example, augmented reality is attracting attention as a next-generation display technology suitable for a ubiquitous environment or an Internet of things (IoT) environment. Such augmented reality can be said to be an example of mixed reality in that it mixes and shows the real world and additional information of the virtual world.

SUMMARY

Aspects of the present disclosure provide a device for providing augmented reality (AR) that can accurately detect an object or a text at which a user gazes, and can display an image associated with the detected object or text as an AR content image, and a system for providing AR using the same.

Aspects of the present disclosure also provide a device for providing AR that can display information related to an object or a text at which a user gazes as AR content information, and can share it with another device, and a system for providing AR using the same.

It should be noted that aspects of the present disclosure are not limited to the above-mentioned aspects, and other aspects of the present disclosure will be apparent to those skilled in the art from the following descriptions.

According to one or more embodiments of the disclosure, a device for providing augmented reality (AR) includes at least one display module configured to display an AR content image through a transparent lens, a sensing module configured to generate signals indicative of movement in left, right, up, and down directions, and to generate image data corresponding to a user's gaze direction, a biosensor configured to detect a user's pupil to output a pupil sensing signal, and a control module configured to detect gaze coordinate information based on the pupil sensing signal, and to extract an object or a text corresponding to the gaze coordinate information from the image data to generate AR content data including the extracted object or text.

The control module may be further configured to provide the AR content data to the at least one display module when the gaze coordinate information is constant for a period, and interrupt displaying the AR content image when a motion signal indicating an intention of denial is received.

The control module may be further configured to retrieve and store information related to the extracted object or text when a motion signal indicating an intention of approval is received, generate the AR content data so that the retrieved information is displayed in the AR content image, and share the AR content data with another content display device.

The control module may be further configured to interrupt sharing of the AR content data when the motion signal indicating the intention of denial is received after the AR content image is displayed.

The control module may include a gaze coordinate generator configured to analyze the pupil sensing signal to detect the user's gaze coordinate information, a gaze duration detector configured to determine a gaze duration in which the gaze coordinate information is sustained, an image processing controller configured to transmit an image data detection signal and the gaze coordinate information when the gaze duration is equal to or greater than a reference duration, an image data detector configured to extract image data corresponding to the user's gaze direction through an image sensor of the sensing module in response to the image data detection signal, and a divided block processor configured to divide the image data into block regions, and to extract block image data of a block region corresponding to the gaze coordinate information from among the block regions.

The control module may further include a motion detector configured to detect a motion in a left direction or a right direction, transmit a motion signal indicating an intention of denial or a motion signal indicating an intention of approval to the image processing controller, and transmit, to the image processing controller, a motion signal indicating an intention to delete depending on whether the pupil sensing signal is received.

The image processing controller may be configured to perform at least one image processing program of edge detection, contrast detection, contour detection, or text filtering to extract object or text information included in an image of the block region, and transmit the AR content data including the extracted object or text information to a display controller and an information detection controller.

The information detection controller may be configured to transmit the object or text information to an external database server through a wireless communication unit, retrieve and extract information related to the object or text information through a search engine or a search program, and share the information with the image processing controller.

The display controller may be configured to modulate the AR content data so that a border line of a color is added to an image corresponding to the information, or so that the image corresponding to the information is displayed in a background image of a corresponding color, and transmit the modulated AR content data to the at least one display module.

The at least one display module may be assembled on one or more sides of a support frame for supporting the transparent lens, or is formed integrally with the support frame, and is configured to display the AR content image through an image transmission member and one or more reflective members.

The at least one display module may include at least one image displayer configured to display the AR content image, and at least one optical member among at least one diffusing lens, at least one focusing lens, a refractive lens, and an optical waveguide for changing a display path of the AR content image.

The at least one image displayer may include a partition wall on a substrate, light-emitting elements in respective emission areas arranged in a PENTILE™ matrix by partitions of the partition wall, and extending in a thickness direction of the substrate, a base resin formed in the emission areas, and optical patterns located on at least one of the emission areas.

First to third or fourth emission areas of the emission areas may be arranged in the PENTILE™ matrix in each pixel area.

The first emission area may include a first light-emitting element configured to emit a first light of red, green, or blue, wherein the second emission area includes a second light-emitting element configured to emit a second light having of red, green, or blue and different from the first light, wherein the third emission area includes a third light-emitting element configured to emit a third light of red, green, or blue and different from the first light and the second light, and wherein the fourth emission area includes a fourth light-emitting element configured to emit a fourth light that is the same as one of the first to third lights.

The first to fourth emission areas may have a same size or area when viewed from top, wherein a distance between the first emission area and the second emission area, a distance between the second emission area and the third emission area, a distance between the first emission area and the third emission area, and a distance between the third emission area and the fourth emission area, which are adjacent to each other in a horizontal or diagonal direction, are equal.

The first to fourth emission areas may have different sizes or areas in plan view, wherein a distance between the first emission area and the second emission area, a distance between the second emission area and the third emission area, a distance between the first emission area and the third emission area, and a distance between the third emission area and the fourth emission area are equal or different depending on the size or area of each of the first to fourth emission areas.

According to one or more embodiments of the disclosure, a system for providing augmented reality (AR) includes a device for providing AR that is configured to extract an object or a text corresponding to a user's gaze coordinate information, and to display the extracted object or text as an AR content image, a database server configured to supply information related to the extracted object or text to the device for providing AR, and at least one content display device configured to receive the AR content image from the device for providing AR to equally display it.

The device for providing AR may include a support frame for supporting at least one transparent lens, at least one display module for displaying an AR content image through at least one transparent lens, a sensing module mounted on the support frame to generate signals indicative of movement in left, right, up, and down directions, and to generate image data corresponding to the user's gaze direction, first and second biometric sensors for detecting a user's pupil who wears the support frame to output a pupil sensing signal, and a control module configured to detect the user's gaze coordinate information based on the pupil sensing signal, and configured to generate AR content data so that the extracted object or text is displayed as the AR content image.

The at least one display module may include at least one image displayer configured to display the AR content image, and at least one optical member among at least one diffusing lens, at least one focusing lens, a refractive lens, and an optical waveguide for changing a display path of the AR content image.

The control module may be configured to retrieve and store the information related to the extracted object or text through the database server, generate the AR content data so that the information retrieved from the database server is additionally displayed as the AR content image, and share AR content data with the at least one content display device.

According to one or more embodiments of the present disclosure, it is possible to increase the utility of a device for providing AR by displaying an image associated with an object or a text at which the user gazes as an AR content image.

According to one or more embodiments of the present disclosure, it is possible to improve the satisfaction and reliability of a device for providing AR by displaying and utilizing related information associated with the object or text at which the user gazes as AR content information.

It should be noted that aspects of the present disclosure are not limited to those described above and other aspects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which:

FIG. 6 is a view showing in detail a layout of the image displayer shown in FIG. 5.

DETAILED DESCRIPTION

Figure 1:
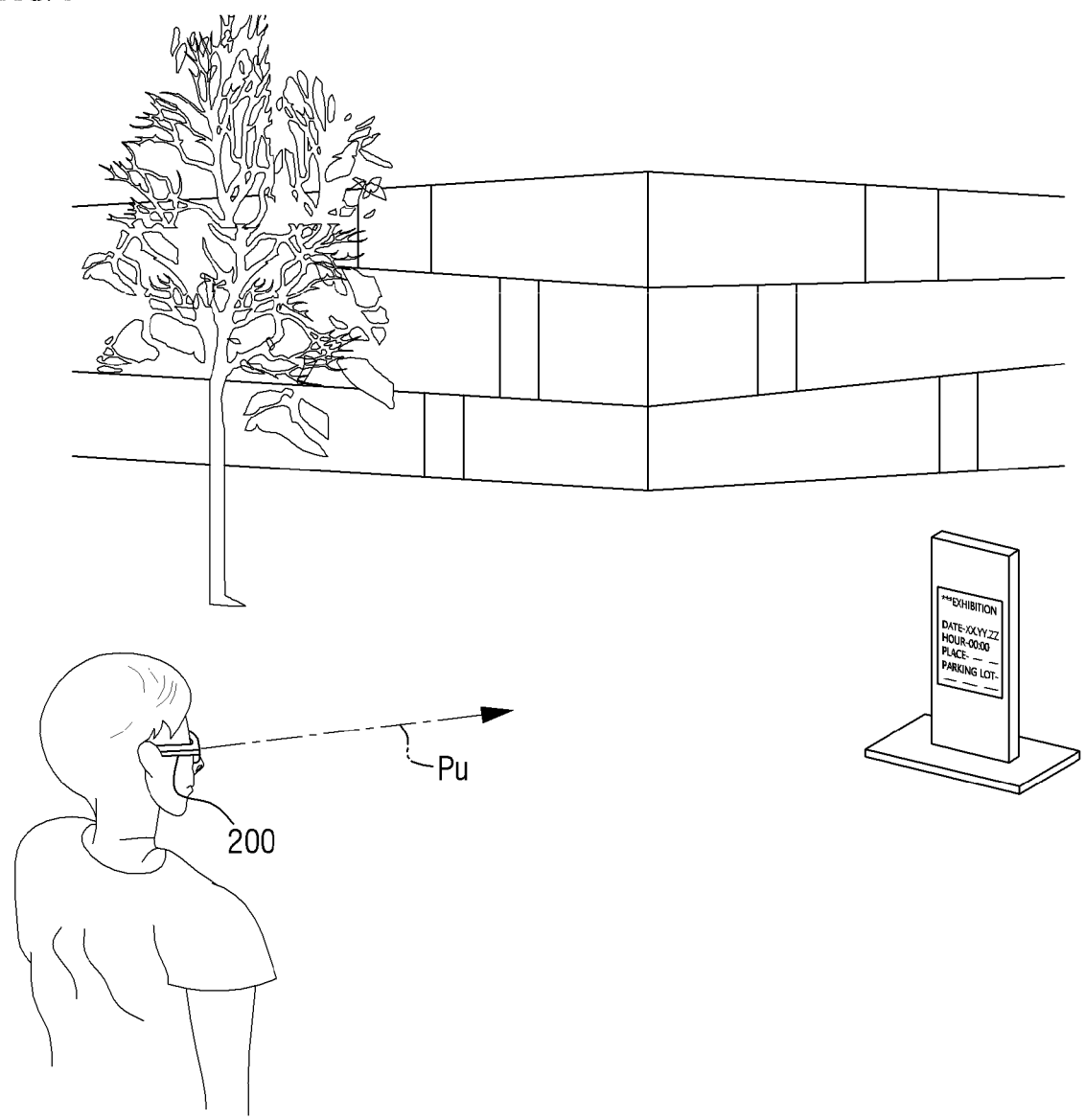
FIG. 1 is a view showing a display device for providing augmented reality (AR) according to one or more embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a view showing a display device for providing augmented reality (AR) according to one or more embodiments of the present disclosure.

Referring to FIG. 1, a device 200 may be formed integrally with a frame in the form of glasses that a user can easily carry and put on/take off, or may be mounted or assembled on the frame. The device for providing AR (hereinafter, "device") 200 provides the AR content images to a user's eyes through a transparent lens so that the image of the AR contents is superimposed on the real image seen by the user's eyes through the transparent lens. The AR contents may include two-dimensional or three-dimensional image contents in which a graphic image, a captured image, text, etc. are combined, sound contents, etc.

The device 200 may further include at least one display module for displaying images of the AR contents, and optical members for creating the display paths (or the light paths) of images of the AR contents so that the images of the AR contents displayed on the display module can be perceived by the user's eyes through a transparent lens.

The device 200 detects the user's gaze coordinate information Pu by recognizing the user's pupils, and acquires gaze point image data if the detected gaze coordinate information Pu remains constant for a period (e.g., predetermined period). Then, an image such as an object and a text corresponding to the gaze coordinate information Pu is extracted from the image data, and the extracted object or text image is displayed as an AR content image.

The device 200 may detect the user's motion information after the AR content image is displayed, and may interrupt the display operation of the AR content image if the motion information (e.g., predetermined motion information) indicating a user's denial is received, and then may delete the displayed image. On the other hand, if motion information (e.g., predetermined motion information) indicating the user's approval is received, the device 200 downloads and stores the detailed information related to an object or a text of the AR content image. In addition, the downloaded detailed information is also converted into image data and displayed as an AR content image. All of the AR content images and image data displayed on the device 200 may be shared by a separate content display device such as a tablet personal computer (PC) and a smart phone so that they are equally displayed. The device 200 may interrupt displaying and sharing the detailed information on the object or text as well as the AR content image if the motion information (e.g., predetermined motion information) indicating a user's intention to delete is received after the AR content images are displayed.

To more accurately detect the direction in which the user gazes, the object or the text in the direction, etc., the device 200 detects the movement information on the pupils in at least three axes (e.g., x-axis, y-axis, and z-axis) directions, and its own motion information. As used herein, the x-axis may be the horizontal axis direction, the y-axis may be the vertical axis direction, and the z-axis may be the depth (or distance) axis direction. Accordingly, the device 200 may detect the motion information in real time such as the user's eye blinking, head shake, and head nod (or up-and-down movement). In addition, the device 200 may detect the position and motion information of a pointing tool, such as a writing tool, in addition to the user's hand shape, hand gesture, and hand position. Hereinafter, an example will be described where the motion information associated with the user's eye blinking, head shake, and head nod is detected. It should be understood, however, that the present disclosure is not limited thereto.

Figure 2:
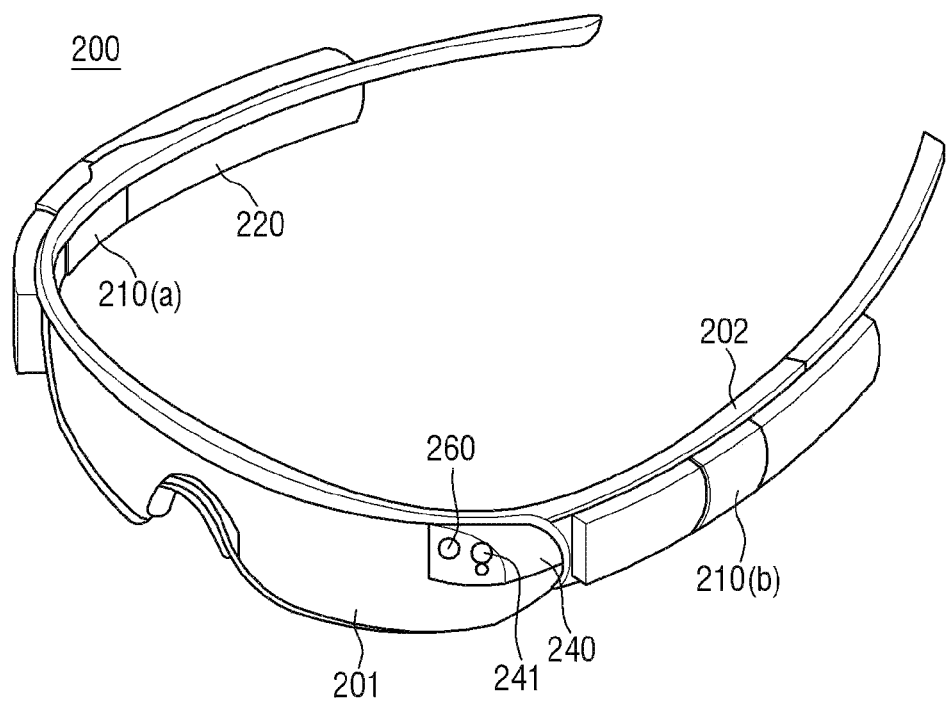
FIG. 2 is a perspective view showing the device for providing AR shown in FIG. 1.
Figure 3:
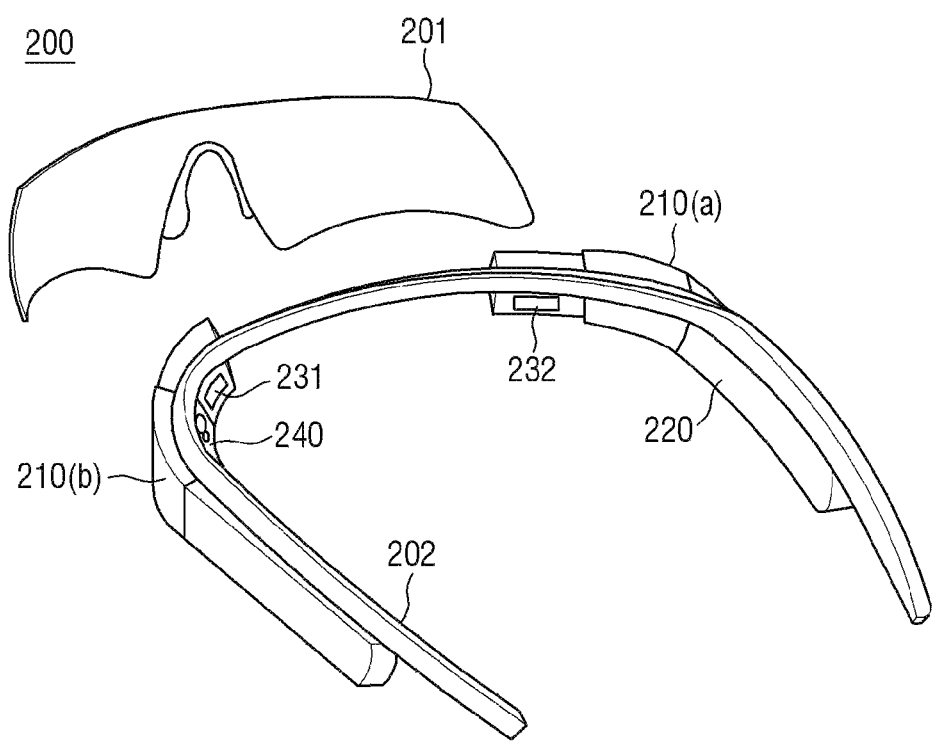
FIG. 3 is an exploded perspective view of the device for providing AR shown in FIG. 2 when viewed from the side.
Figure 4:
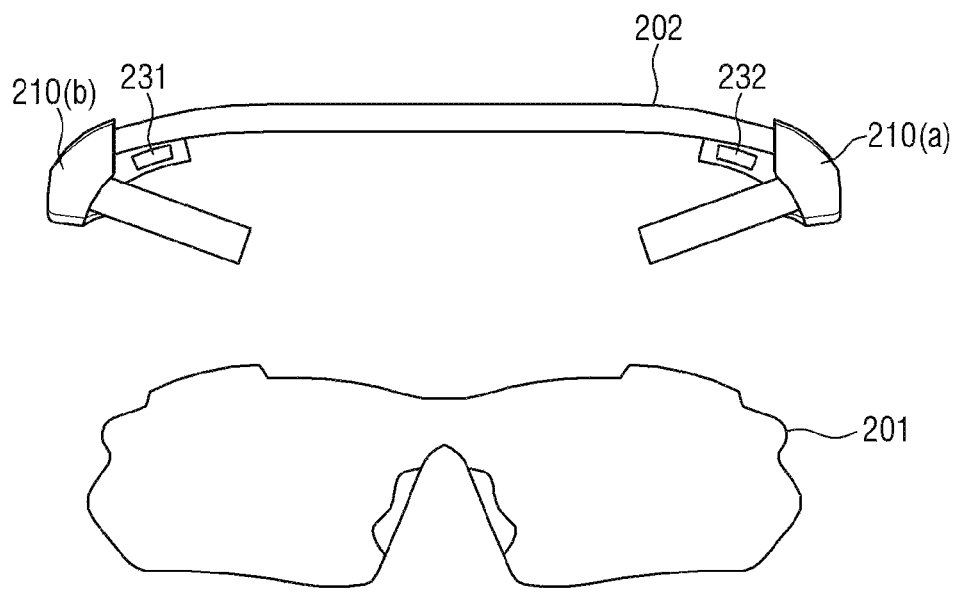
FIG. 4 is an exploded perspective view of the device for providing AR shown in FIGS. 2 and 3 when viewed from the rear side.

FIG. 2 is a perspective view showing the device for providing AR shown in FIG. 1. FIG. 3 is an exploded perspective view of the device for providing AR shown in FIG. 2 when viewed from the side. FIG. 4 is an exploded perspective view of the device for providing AR shown in FIGS. 2 and 3 when viewed from the rear side.

Referring to FIGS. 2 to 4, the device 200 includes a support frame 202 supporting at least one transparent lens 201, at least one display module 210(a) and 210(b), a sensing module 240 detecting a motion, and at least one control module 220.

The support frame 202 may be implemented in a glasses-like shape including a frame for supporting the at least one transparent lens 201, and temples. The shape of the support frame 202 is not limited to a glasses type, but may be formed in a goggles type or a head mountain type including a transparent lens.

The transparent lens 201 may have left and right parts connected with each other or may have a first transparent lens and a second transparent lens separately on the left side and right side, respectively. The transparent lens 201 having the left and right parts formed integrally or the first and second transparent lenses formed separately may be made of glass or plastic so that it is transparent or translucent. Accordingly, the user can see the image of the real world through the transparent lens 201, which has the left and right parts formed integrally, or through the first and second transparent lenses formed separately. The transparent lens 201, which is either the integrated parts or the separated first and second transparent lenses, may have refractive power in consideration of the user's eyesight.

The transparent lens 201 may further include at least one reflective member for reflecting the AR content image provided from the at least one display module 210(a) and 210(b) toward the transparent lens 201 or the user's eyes, and optical members for adjusting the focus and size. The at least one reflective member may be incorporated into the transparent lens 201 as a part of it, and may be formed as a plurality of refractive lenses or a plurality of prisms having a curvature (e.g., predetermined curvature).

The at least one display module 210(*a*) and 210(*b*) may include a micro LED display device (micro-LED), a nano LED display device (nano-LED), an organic light-emitting display device (OLED), an inorganic light-emitting display device (inorganic EL), a quantum-dot light-emitting display device (QED), a cathode ray display device (CRT), a liquid-crystal display device (LCD), etc. In the following description, a micro LED display device is included in the at least one display module 210(*a*) and 210(*b*). The micro LED display device will be simply referred to as a display device unless it is necessary to discern them. It should be understood, however, that the embodiments of the present disclosure are not limited to the micro LED display devices, and any other display device listed above or well known in the art may be employed without departing from the scope of the present disclosure.

The sensing module 240 is assembled to, or formed integrally with, the support frame 202, and senses the distance (or depth) to an object on the front side of the support frame 202, the illuminance, the moving direction of the support frame 202, the moving distance, tilt, etc. To this end, the sensing module 240 includes a depth sensor 241, such as an infrared sensor and a Lidar sensor, and an image sensor 260, such as a camera. In addition, the sensing module 240 further includes first and second biosensors 231 and 232 for detecting motion information of the user's eyes or pupils. In addition, the sensing module 240 may further include at least one motion sensor among an illuminance sensor, a human body detection sensor, a gyro sensor, a tilt sensor, and an acceleration sensor.

The first and second biosensors 231 and 232 are located on the inner side of the support frame 202 facing the user's eyes, and include at least one infrared light source and at least one infrared camera. The at least one infrared light source outputs infrared rays, and the at least one infrared camera detects infrared rays reflected off eyeballs or pupils as subjects. The at least one infrared light source may be configured as an infrared LED array having a matrix structure. In addition, the infrared camera may include a filter that transmits infrared rays and blocks wavelength ranges other than infrared rays, a lens system for focusing the infrared rays transmitted the filter, and an optical image sensor that converts the optical image formed by the lens system into an electrical image signal and outputs it, etc. Like the infrared LED array, the optical image sensor may be implemented as an array in a matrix form.

The sensing module 240 transmits sensing signals generated through the depth sensor 241 and at least one motion sensor to the control module 220 in real time. In addition, the image sensor 260 transmits image data within at least one frame generated in real time to the control module 220. The first and second biosensors 231 and 232 of the sensing module 240 transmit detected pupil sensing signals to the control module 220.

The control module 220 may be assembled to at least one side of the support frame 202 together with the at least one display module 210(*a*) and/or 210(*b*), or may be integrally formed with the support frame 202. The control module 220 supplies the AR contents data to the at least one display module 210(*a*) and 210(*b*) so that the at least one display module 210(*a*) and 210(*b*) displays the AR contents, for example, the AR content image. At the same time, the control module 220 receives sensing signals from the sensing module 240, image data from the image sensor 260, and pupil sensing signals from the first and second biosensors 231 and 232 in real time.

The control module 220 detects the user's gaze coordinate information Pu (see FIG. 1) based on the matrix arrangement structure of the optical image sensors included in the first and second biosensors 231 and 232, the infrared reception positions of the optical image sensors, and the analysis results of the pupil sensing signals. In addition, the control module 220 detects movement information of the device 200 through the sensing signals from the sensing module 240, and acquires and stores the image data of the user's gaze direction (or the front side of the device 200) through the image sensor 260. Accordingly, the control module 220 may divide the image data in the user's gaze direction into a plurality of block regions (e.g., predetermined block regions), and may detect image data of the divided block regions corresponding to the user's gaze coordinate information Pu. The control module 220 corrects the image data of the divided block region corresponding to the gaze coordinate information Pu or the object or text information included in the image data of the divided block region, etc., into the AR content image data, and transmits it to the at least one display module 210(*a*) and 210(*b*). The object or text information included in the image data of the divided block region may be displayed as an AR content image on the transparent lens 201 by the at least one display module 210(*a*) and 210(*b*).

After the AR content image data is transmitted, the control module 220 receives the sensing signals from the sensing module 240 to sense the user's motion information (e.g., the user's eye blinking, head shake, head nod, etc.). In addition, the display operation of the AR content image may be interrupted if the motion information means an intention of denial, such as head shake. In addition, the control module 220 extracts detailed information related to the object or text of the AR content image if the motion information indicating the intention of approval, such as eye blinking, and also modulates the extracted detailed information into AR content image data to transmit it to the at least one display module 210(*a*) and 210(*b*). Accordingly, the detailed information associated with the object or text of the AR content image may also be displayed as the AR content image by the at least one display module 210(*a*) and 210(*b*). The control module 220 may interrupt the displaying operation of the detailed information associated with the object or text upon receiving the motion information indicating an intention to delete, such as head nod.

Figure 5:
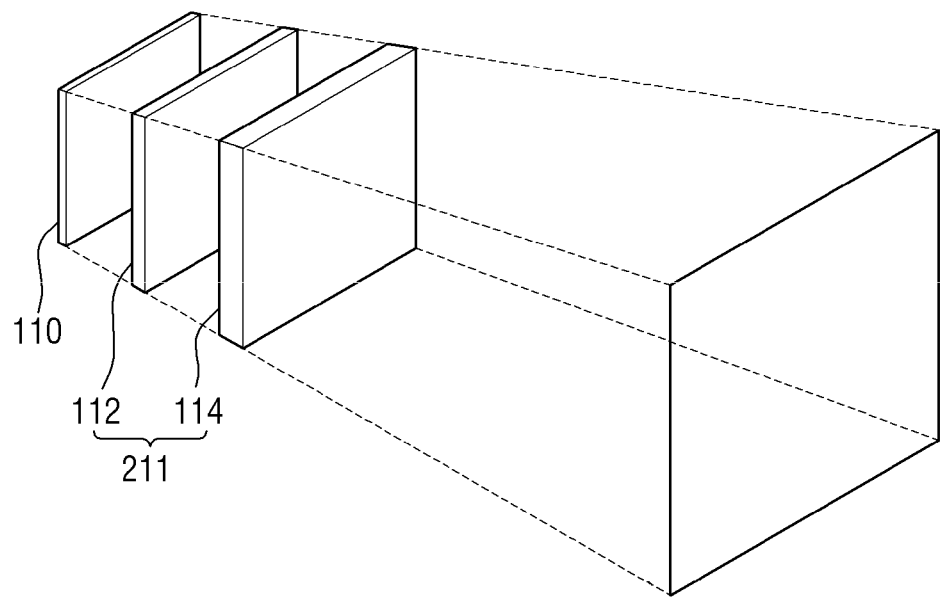
FIG. 5 is a view showing the configuration of the display module of the device for providing AR shown in FIGS. 2 to 4.

FIG. 5 is a view showing the configuration of the display module of the device for providing AR shown in FIGS. 2 to 4.

Referring to FIGS. 2 to 5, the at least one display module 210(*a*) and 210(*b*) for displaying the AR content image may be assembled on one side or both sides of the support frame 202, or may be formed integrally with the support frame 202.

One display module 210(*a*) will be described as an example. The display module 210(*a*) allows the AR content image to be displayed on the at least one transparent lens 201, so that the AR content image is superimposed on the real image shown to the user through the at least one transparent lens 201. To this end, the display module 210(*a*) includes at least one image displayer 110 for displaying an AR content image, and an image transmission member 211 for transmitting the AR content image to the at least one transparent lens 201. The image transmission member 211 may include at least one optical member among an optical waveguide (e.g., a prism), a diffusion lens 112 and a focusing lens 114. The AR content image displayed through each image displayer 110 may be provided to the at least one transparent lens 201 and the user's eyes through the optical waveguide, the diffusion lens 112, and at least one focusing lens 114.

The image displayer 110 included in the display module 210 may include a micro LED display device (micro-LED), a nano LED display device (nano-LED), an organic light-emitting display device (OLED), an inorganic light-emitting display device (inorganic EL), a quantum-dot light-emitting display device (QED), a cathode ray display device (CRT), a liquid-crystal display device (LCD), etc. In the following description, the image displayer 110 includes a micro LED display device as an example. It should be understood, however, that the embodiments of the present disclosure are not limited to the micro LED display devices, and any other display device listed above or well known in the art may be employed without departing from the scope of the present disclosure.

Figure 7:
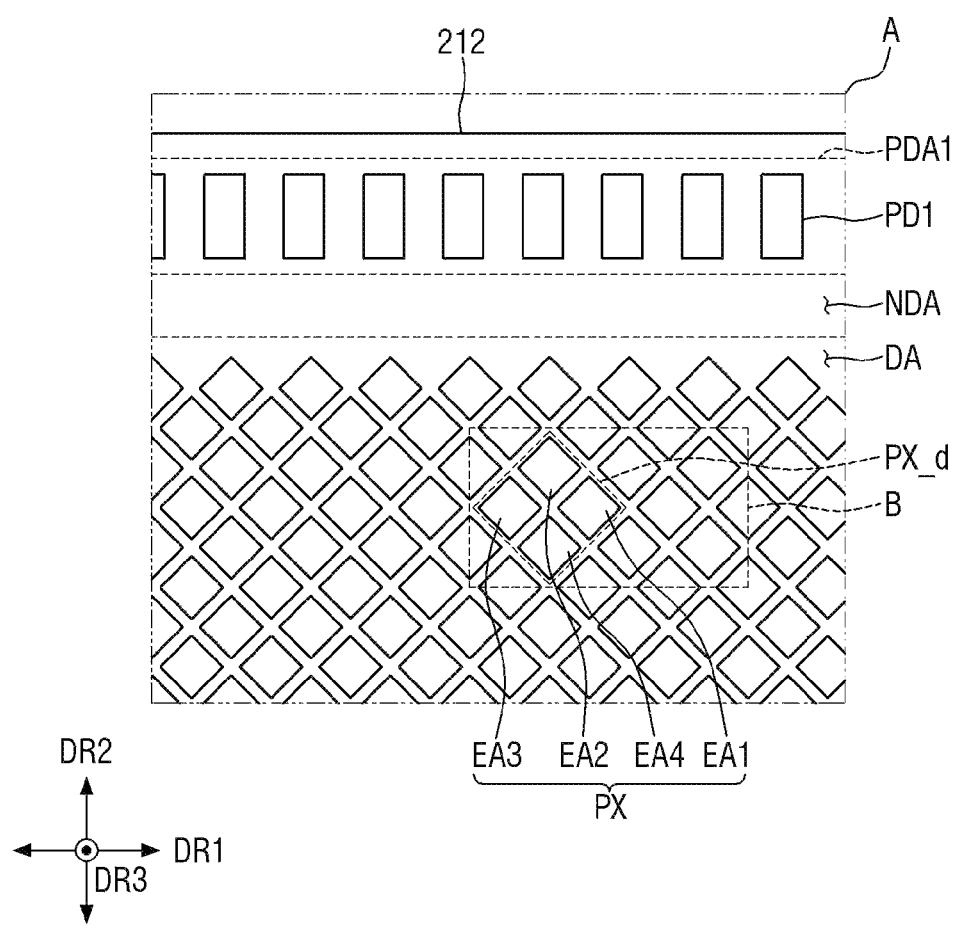
FIG. 7 is a layout diagram showing in detail area A of FIG. 6.
Figure 8:
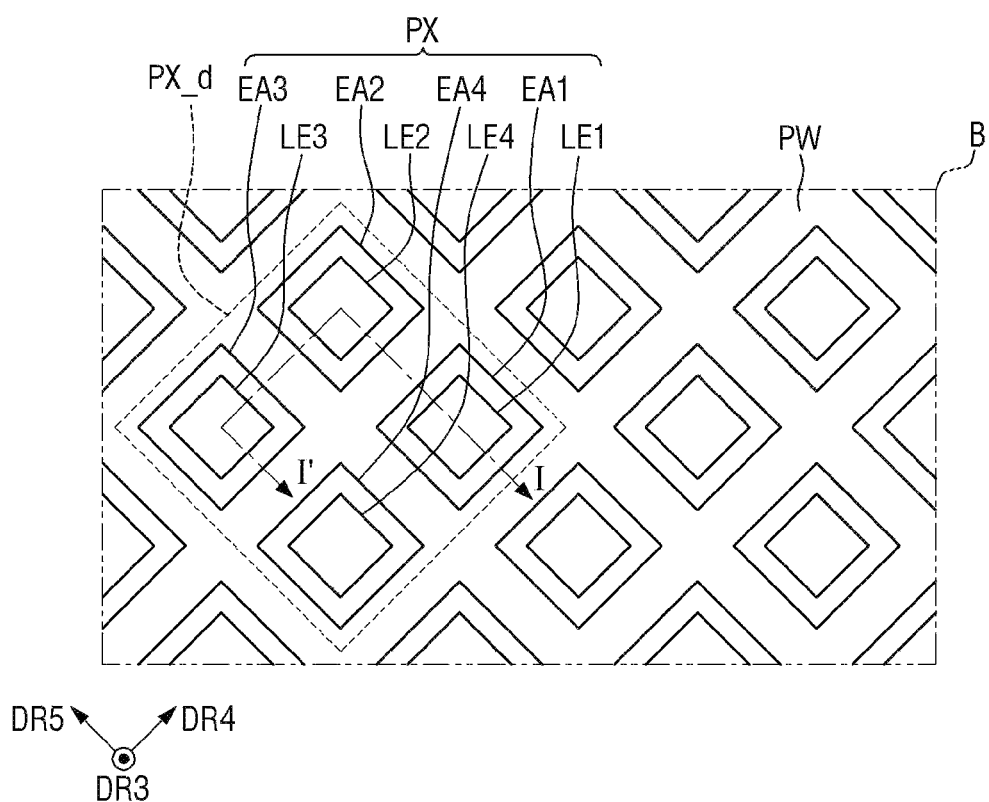
FIG. 8 is a view showing in detail a layout of pixels shown in area B of FIG. 7.

FIG. 6 is a view showing in detail a layout of the image displayer shown in FIG. 5. FIG. 7 is a view showing in detail a layout of area A of FIG. 6. FIG. 8 is a view showing in detail a layout of pixels shown in area B of FIG. 7.

The image displayer 110 according to the embodiments corresponding to FIGS. 6 to 8 has been described with an example of a light-emitting diode on silicon (LEDoS) structure in which light-emitting diodes are located on a semiconductor circuit board formed via a semiconductor process. It should be noted, however, that the embodiments of the present disclosure are not limited thereto. In addition, although the image displayer 110 according to one or more embodiments of the present disclosure is a micro light-emitting diode display module (micro or nano light-emitting diode display module) including micro light-emitting diodes (micro or nano light-emitting diodes) as light-emitting elements, the embodiments of the present disclosure are not limited thereto.

In FIGS. 6 to 8, a first direction DR1 indicates the horizontal direction of the image displayer 110, a second direction DR2 indicates the vertical direction of the image displayer 110, and a third direction DR3 indicates the thickness direction of a display panel 212 or the thickness direction of a semiconductor circuit board 215. In addition, as shown in FIG. 8, a fourth direction DR4 indicates a diagonal direction of the display panel 212, and a fifth direction DR5 indicates a diagonal direction crossing the fourth direction DR4. As used herein, the terms "left," "right," "upper," and "lower" sides indicate relative positions when the display panel 212 is viewed from the top. For example, the right side refers to one side in the first direction DR1, the left side refers to the other side in the first direction DR1, the upper side refers to one side in the second direction DR2, and the lower side refers to the other side in the second direction DR2. In addition, the upper portion refers to the side indicated by the arrow of the third direction DR3, while the lower portion refers to the opposite side in the third direction DR3.

Referring to FIGS. 6 to 8, the image displayer 110 has a display panel 212 including a display area DA and a non-display area NDA.

The display panel 212 of the image displayer 110 may have a rectangular shape having longer sides in the first direction DR1 and shorter sides in the second direction DR2 when viewed from the top (e.g., in plan view). It should be understood, however, that the shape of the display panels 212 when viewed from the top is not limited thereto. It may have a polygonal, circular, oval, or irregular shape other than the rectangular shape when viewed from the top.

In the display area DPA, images can be displayed. In the non-display area NDA, no image may be displayed. The shape of the display area DA may follow the shape of the display panel 212 when viewed from the top. In the example shown in FIG. 6, the display area DA has a rectangular shape when viewed from the top. The display area DA may be generally located at the central area of the display panel 212. The non-display area NDA may be located around the display area DA. The non-display area NDA may surround the display area DA in plan view.

The first pad area PDA1 may be located in the non-display area NDA. The first pad area PDA1 may be located at the upper portion of the display panel 212. The first pad area PDA1 may include first pads PD1 connected to an external circuit board. A second pad area PDA2 may be located in the non-display area NDA. The second pad area PDA2 may be located at the lower portion of the semiconductor circuit board. The second pad area PDA2 may include second pads connected to an external circuit board. The second pad area PDA2 may be omitted in other embodiments.

The display area DA of the display panel 212 may include a plurality of pixels PX. Each of the pixels PX may be defined as the minimum light-emitting unit for reproducing white light in a defined pixel area PX_d.

Each of the pixels PX located as the minimum unit capable of reproducing white light in the pixel area PX_d may include a plurality of emission areas EA1, EA2, EA3, and EA4. Although each of the pixels PX includes four light-emitting areas EA1, EA2, EA3, and EA4 arranged in a PENTILE™ matrix in one or more embodiments of the present disclosure, the present disclosure is not limited thereto. For example, each of the plurality of pixels PX may include only three emission areas EA1, EA2 and EA3.

The emission areas EA1, EA2, EA3, and EA4 of each pixel area PX_d may be partitioned by the partition wall PW. The partition wall PW may be located to surround the first to fourth light-emitting elements LE1 to LE4 located in the emission areas EA1, EA2, EA3, and EA4. The partition wall PW may be located apart from the first to fourth light-emitting elements LE1 to LE4. The partition wall PW may have a mesh shape, a net shape, or a grid shape when viewed from the top.

Although each of the emission areas EA1, EA2, EA3, and EA4 defined by the partition wall PW has a diamond shape when viewed from the top, which form the PENTILE™ matrix (e.g., RGBG matrix, PENTILE™ matrix structure, PENTILE™ structure, or RGBG structure, PENTILE™ being a registered trademark of Samsung Display Co., Ltd., Republic of Korea) in the example shown in FIGS. 7 and 8, the present disclosure is not limited thereto. For example, each of the emission areas EA1, EA2, EA3, and EA4 defined by the partition wall PW may have a polygonal shape, such as a quadrangle and triangle, a circular shape, an oval shape, or irregular shape other than a diamond shape.

Referring to FIG. 8, among the plurality of emission areas EA1, EA2, EA3, and EA4, the first emission area EA1 may include a first light-emitting element LE1 that emits a first light, the second emission area EA2 may include a second light-emitting element LE2 that emits a second light, the third emission area EA3 may include a third light-emitting element LE3 that emits a third light, and the fourth emission area EA4 may include a fourth light-emitting element LE4 that emits a fourth light. The first light may be light of a wavelength range reproducing one of red, green, and blue colors. The second light may be light of a wavelength range that reproduces one of red, green, and blue colors, which is different from the first light. The third light may be light of a wavelength range that reproduces one of red, green, and blue colors, which is different from the first light and the second light. The fourth light may be light of the same wavelength range as one of the first to third lights.

Each of the first to fourth light-emitting elements LE1 to LE4 included in the first to fourth emission areas EA1 to EA4, respectively, arranged in a PENTILE™ matrix has a diamond shape when viewed from the top, but the present disclosure is not limited thereto. For example, each of the first to fourth light-emitting elements LE1 to LE4 may have a polygonal shape, such as a triangle and quadrangle, a circular shape, an oval shape, or irregular shape other than a diamond shape.

Each of the first emission areas EA1 emits the first light. Each of the first emission areas EA1 outputs the first light emitted from the first light-emitting element LE1. As described above, the first light may be light of a wavelength range reproducing one of red, green, and blue colors. For example, the first light may be light in the red wavelength range. The red wavelength range may be about 600 nm to about 750 nm, but embodiments of the present disclosure are not limited thereto.

Each of the second emission areas EA2 emits a second light. Each of the second emission areas EA2 outputs the second light emitted from the second light-emitting element LE2. The second light may be light of a wavelength range that reproduces one of red, green, and blue colors, which is different from the first light. For example, the second light may be light in the blue wavelength range. The blue wavelength range may be about 370 nm to about 460 nm, but embodiments of the present disclosure are not limited thereto.

Each of the third emission areas EA3 emits a third light. Each of the third emission areas EA3 outputs the third light emitted from the third light-emitting element LE3. The third light may be light of a wavelength range that reproduces one of red, green, and blue colors, which is different from the first light and the second light. For example, the third light may be light in the green wavelength range. The green wavelength range may be about 480 nm to about 560 nm, but embodiments of the present disclosure are not limited thereto.

Each of the fourth emission areas EA4 emits the fourth light. Each of the fourth emission areas EA4 outputs the fourth light emitted from the fourth light-emitting element LE4. The fourth light may be light of the same wavelength range that reproduces the same color as one of the first to third lights. For example, the fourth light may be light of the same blue wavelength band as the second light, or light of the same green wavelength band as the third light. The embodiments of the present disclosure are not limited thereto.

The second emission areas EA2 of the pixels PX may alternately arranged with the fourth emission areas EA4 of adjacent pixels PX along the first direction DR1 which is the horizontal (or row) direction. In addition, the first emission areas EA1 and the third emission areas EA3 of the pixels PX may be alternately arranged along the first direction DR1, which is the horizontal (or row) direction. On the other hand, the fourth emission areas EA4 of the pixels PX may alternately arranged with the second emission areas EA2 of adjacent pixels PX along the first direction DR1, which is the horizontal (or row) direction.

The first emission areas EA1 and the fourth emission areas EA4 are alternately arranged in the fourth direction DR4, which is a first diagonal direction, and the second emission areas EA2 and the third emission areas EA3 are also alternately arranged in the fourth direction DR4. Accordingly, the second emission areas EA2 and the first emission areas EA1 are alternately arranged in the fifth direction DR5, which is a second diagonal direction, and the third emission areas EA3 and the fourth emission areas EA4 are also alternately arranged in the fifth direction DR5, such that the pixels PX may also be arranged generally in the PENTILE™ matrix.

The size or area of each of the first to fourth emission areas EA1 to EA4 of each of the pixels PX may have the same size or area, or different sizes or areas. Similarly, the first to fourth light-emitting elements LE1 to LE4 respectively formed in the first to fourth emission areas EA1 to EA4 may have the same size or area, or different sizes or areas.

For example, the area of the first emission area EA1, the area of the second emission area EA2, the area of the third emission area EA3, and the area of the fourth emission area EA4 may be substantially all equal. It should be understood, however, that the present disclosure is not limited thereto. For example, the first and second emission areas EA1 and EA2 may have different respective areas, the second and third emission areas EA2 and EA3 may have different respective areas, and the third and fourth emission areas EA3 and EA4 may have different respective areas. In this instance, at least two pairs of the first to fourth emission areas EA1 to EA4 may have the same area.

The distance between the first and second emission areas EA1 and EA2, the distance between the second and third emission areas EA2 and EA3, the distance between the third and fourth emission areas EA3 and EA4, and the distance between the first and fourth emission areas EA1 and EA4, which are adjacent to each other in the horizontal or diagonal direction, may be all equal or may be different from each other depending on the varying areas. However, the embodiments of the present disclosure are not limited thereto.

Although the first emission area EA1 emits the first light, the second emission area EA2 emits the second light, the third emission area EA3 emits the third light, and the fourth emission area EA4 emits the same light as one of the first to third lights in the foregoing description, this is merely illustrative. At least one of the first to fourth emission areas EA1 to EA4 may emit a fifth light. The fifth light may be light of the yellow wavelength range. For example, the main peak wavelength of the fifth light may range from about 550 nm to about 600 nm, but embodiments of the present disclosure are not limited thereto.

Figure 9:
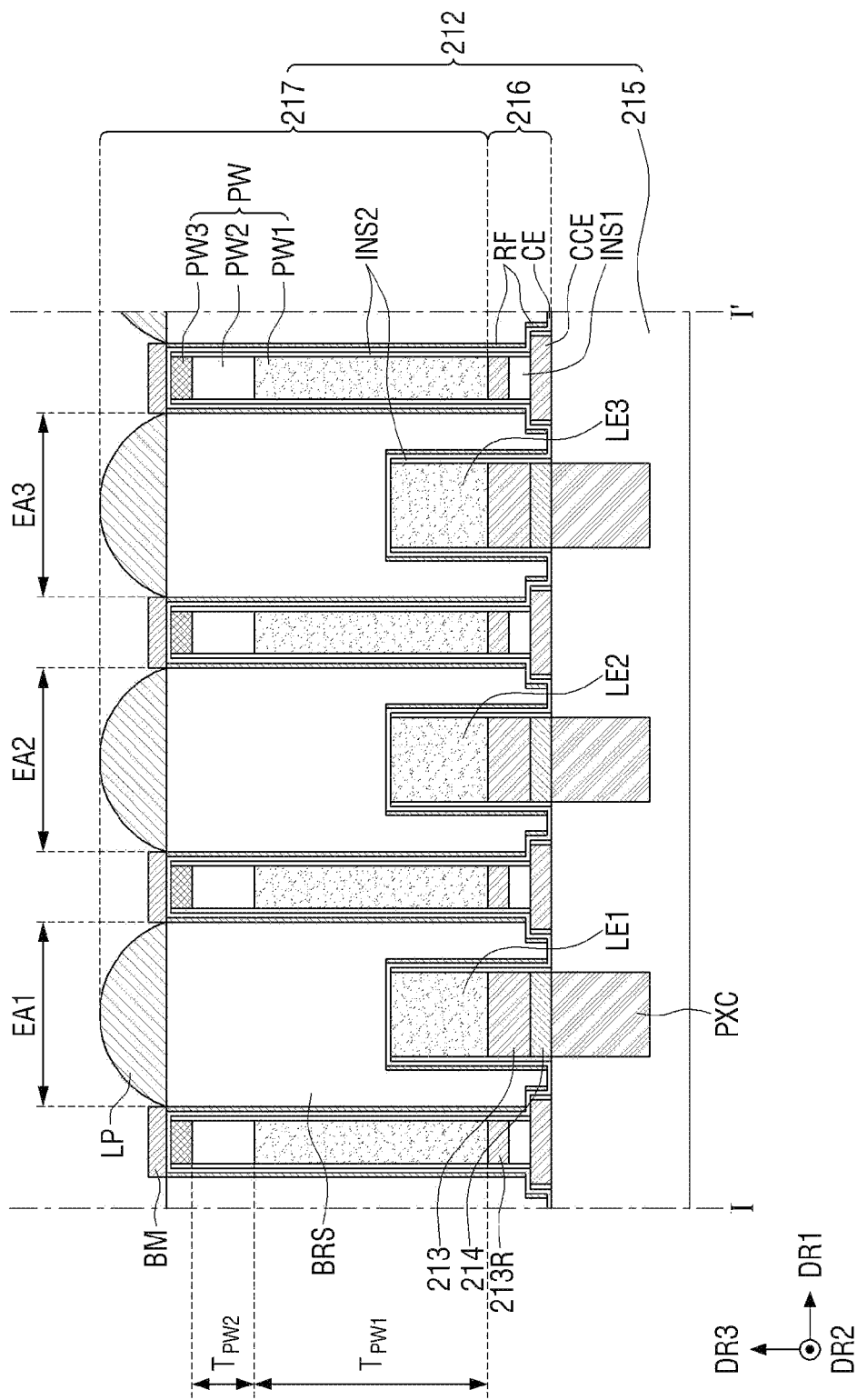
FIG. 9 is a cross-sectional view showing an example of the image displayer, taken along the line I-I' of FIG. 8.
Figure 10:
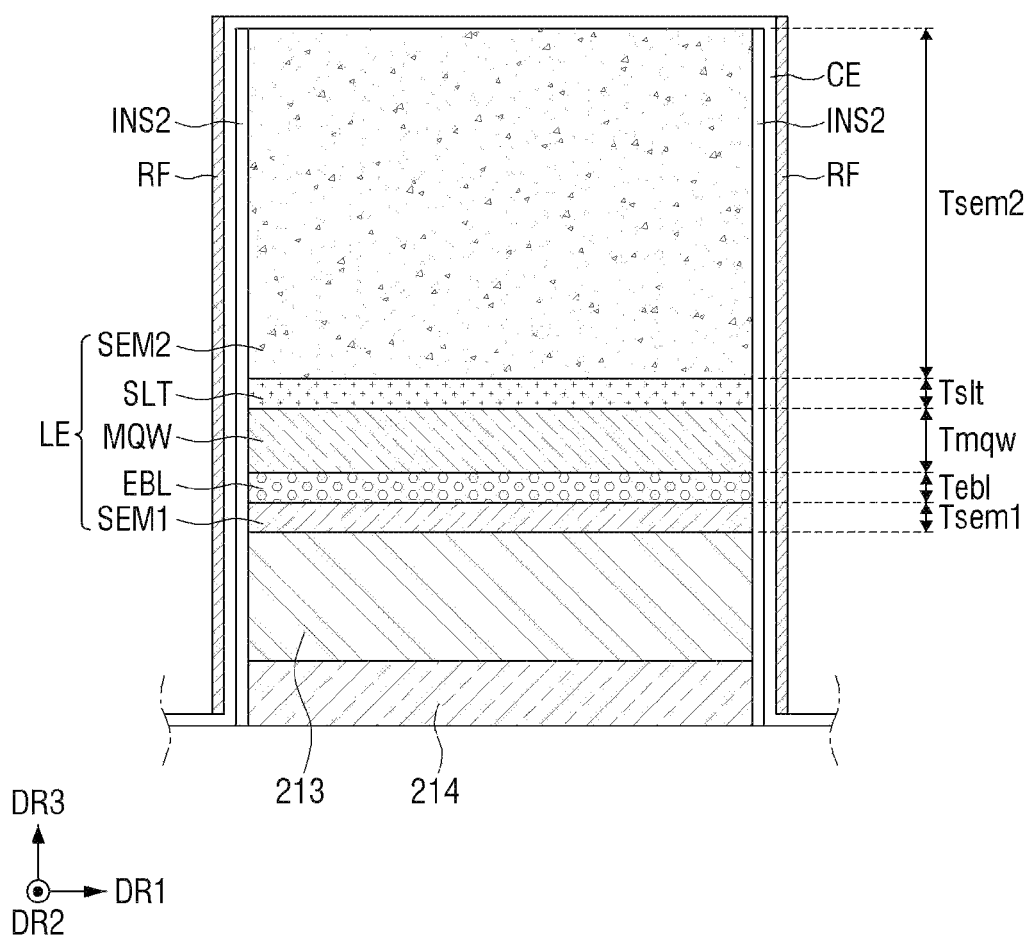
FIG. 10 is an enlarged, cross-sectional view showing in detail an example of the light-emitting element of FIG. 9.

FIG. 9 is a cross-sectional view showing an example of the image displayer, taken along the line I-I' of FIG. 8. FIG. 10 is an enlarged, cross-sectional view showing in detail an example of the light-emitting elements of FIG. 9.

Referring to FIGS. 9 and 10, the display panel 212 may include the semiconductor circuit board 215, a conductive connection layer 216, and a light-emitting element layer 217.

The semiconductor circuit board 215 may include a plurality of pixel circuits PXC and pixel electrodes 214. The conductive connection layer 216 may include connection electrodes 213, first pads PD1, a common connection electrode CCE, a first insulating layer INS1, and a conductive pattern 213R.

The semiconductor circuit board 215 may be a silicon wafer substrate formed via a semiconductor process. The plurality of pixel circuits PXC of the semiconductor circuit board 215 may be formed via a semiconductor process.

The plurality of pixel circuits PXC may be located in the display area DA (see FIG. 6). The plurality of pixel circuits PXC may be connected to the pixel electrodes 214, respectively. In other words, the plurality of pixel circuits PXC and the plurality of pixel electrodes 214 may be connected in a one-to-one correspondence. The plurality of pixel circuits PXC may overlap the light-emitting elements LE1 to LE4 in the third direction DR3, respectively. Each pixel circuit PXC may employ a variety of other modified pixel structures such as a 3T1C structure, a 2T1C structure, a 7T1C structure, and a 6T1C structure.

The pixel electrodes 214 may be located on the pixel circuits PXC, respectively. Each of the pixel electrodes 214 may be an exposed electrode exposed from the respective pixel circuit PXC. In other words, each of the pixel electrodes 214 may protrude from the upper surface of the respective pixel circuit PXC. The pixel electrodes 214 may be formed integrally with the pixel circuits PXC, respectively. Each of the pixel electrodes 214 may receive a pixel voltage or an anode voltage from the respective pixel circuit PXC. The pixel electrodes 214 may be made of aluminum (Al).

The connection electrodes 213 may be located on the pixel electrodes 214, respectively. Each of the connection electrodes 213 may be located on the pixel electrode 214. The connection electrodes 213 may include a metal material for attaching the pixel electrodes 214 to the light-emitting elements LE, respectively.

The common connection electrode CCE may be spaced apart from the pixel electrode 214 and the connection electrode 213. The common connection electrode CCE may be located to surround the pixel electrode 214 and the connection electrode 213 (e.g., in a plan view). The common connection electrode CCE may be connected to one of the first pads PD1 of the first pad area PDA1 of the non-display area NDA to receive a common voltage. The common connection electrode CCE may include the same material as the connection electrodes 213.

The first insulating layer INS1 may be located on the common connection electrode CCE. The width of the first insulating layer INS1 in the first direction DR1 or the second direction DR2 may be less than the width of the common connection electrode CCE. Accordingly, a part of the upper surface of the common connection electrode CCE may not be covered by the first insulating layer INS1, but instead may be exposed. The part of the upper surface of the common connection electrode CCE that is not covered by the first insulating layer INS1 and is exposed may be in contact with the common electrode CE. Therefore, the common electrode CE may be connected to the common connection electrode CCE.

The conductive pattern 112R may be located on the first insulating layer INS1. The conductive pattern 213R may be located between the first insulating layer INS1 and the partition wall PW. The width of the conductive pattern 213R may be substantially equal to the width of the first insulating layer INS1 and/or the width of the partition wall PW. The conductive pattern 213R may be residues formed via the same process with the connection electrodes 213 and the common connection electrode CCE.

The light-emitting element layer 217 may include the light-emitting elements LE1, LE2, LE3, and LE4, the partition wall PW, a second insulating layer INS2, the common electrode CE, a reflective layer RF, a light-blocking BM, and optical patterns LP.

The light-emitting element layer 217 may include first to fourth emission areas EA1 to EA4 partitioned by the partition wall PW. At least one of the light-emitting elements LE and the optical patterns LP may be located in each of the first to fourth emission areas EA1 to EA4.

The light-emitting elements LE1, LE2, and LE3 of FIG. 9 may be located on the connection electrodes 213 in each of the emission areas EA1 to EA3. The length (or height) of each of the light-emitting elements LE1, LE2, and LE3 in the third direction DR3 may be greater than the length (or width) in the horizontal direction. The horizontal length refers to either the length in the first direction DR1 or the length in the second direction DR2. For example, the length of the first light-emitting element LE1 in the third direction DR3 may be about 1 μm to about 5 μm.

Referring to FIG. 10, each of the light-emitting elements LE1, LE2, LE3, and LE4 includes a first semiconductor layer SEM1, an electron blocking layer EBL, an active layer MQW, a superlattice layer SLT, and a second semiconductor layer SEM2. The first semiconductor layer SEM1, the electron blocking layer EBL, the active layer MQW, the superlattice layer SLT, and the second semiconductor layer SEM2 may be stacked on one another in this order in the third direction DR3.

The first semiconductor layer SEM1 may be located on the connection electrode 213. The first semiconductor layer SEM1 may be a semiconductor layer doped with a dopant of a first conductivity type such as Mg, Zn, Ca, Se and Ba. For example, the first semiconductor layer 31 may be p-GaN doped with p-type Mg. The thickness Tsem1 of the first semiconductor layer SEM1 may range from about 30 nm to about 200 nm.

The electron blocking layer EBL may be located on the first semiconductor layer SEM1. The electron blocking layer EBL may suppress or prevent too many electrons from flowing into the active layer MQW. For example, the electron blocking layer EBL may be p-AlGaN doped with p-type Mg. The thickness Tebl of the electron blocking layer EBL may be about 10 nm to about 50 nm. The electron blocking layer EBL may be eliminated in other embodiments.

The active layer MQW may be divided into first to third active layers. Each of the first to third active layers may include a material having a single or multiple quantum well structure. When each of the first to third active layers includes the material having the multiple quantum well structure, well layers and barrier layers may be alternately stacked on one another in the structure. In this instance, the first active layer may include InGaN or GaAs, and the second active layer and the third active layer may include InGaN. It should be understood, however, that the present disclosure is not limited thereto. The first active layer may emit light by combining electron-hole pairs according to an electrical signal. The first active layer may emit first light having a main peak wavelength in the range of about 600 nm to about 750 nm (e.g., light of the red wavelength range). The second active layer may emit light by combining electron-hole pairs according to an electrical signal. The second active layer may emit third light having a main peak wavelength in the range of about 480 nm to about 560 nm (e.g., light of the green wavelength range). The third active layer may emit light by combining electron-hole pairs according to an electrical signal. The third active layer may emit second light having a main peak wavelength in the range of about 370 nm to about 460 nm (e.g., light of the blue wavelength range).

The first to third active layers may emit lights of different colors depending on the contents of indium. For example, as the content of indium (In) decreases, the wavelength range of light output from each of the first to third active layers may move to the red wavelength range, and as the content of indium (In) increases, the wavelength range of the output light may move to the blue wavelength range. The content of indium (In) in the first active layer may be higher than the content of indium (In) in the second active layer, and the content of indium (In) in the second active layer may be higher than the content of indium (In) in the third active layer. For example, the content of indium (In) in the third active layer may be about 15%, the content of indium (In) in the second active layer may be about 25%, and the content of indium (In) in the first active layer may be about 35% or more.

Because the color of emitted light may vary depending on the content of indium each of the first to third active layers, the light-emitting element layer 217 of each of the light-emitting elements LE1, LE2, and LE3 may emit lights such as the first light, the second light, and the third light equally or differently depending on the content of the indium. For example, if the content of indium (In) in the first to third active layers of the first light-emitting element LE1 is below about 15%, the first light of the red wavelength range having the main peak wavelength from about 600 nm to about 750 nm can be emitted. If the content of indium (In) in the first to third active layers of the second light-emitting element LE2 is equal to about 25%, the second light of the green wavelength range having the main peak wavelength from about 480 nm to 560 nm can be emitted. If the content of indium (In) in the first to third active layers of the third light-emitting element LE3 is above about 35%, the third light of the blue wavelength range having the main peak wavelength from about 370 nm to about 460 nm can be emitted. By adjusting and setting the contents of indium (In) in the first to third active layers of the fourth light-emitting element LE4, the fourth light-emitting element LE4 may emit the first to third lights, too, or may emit another fourth light.

The superlattice layer SLT may be located on the active layer MQW. The superlattice layer SLT may relieve stress between the second semiconductor layer SEM2 and the active layer MQW. For example, the superlattice layer SLT may be made of InGaN or GaN. The thickness Tslt of the superlattice layer SLT may be about 50 nm to about 200 nm. The superlattice layer SLT may be eliminated.

The second semiconductor layer SEM2 may be located on the superlattice layer SLT. The second semiconductor layer SEM2 may be doped with a dopant of a second conductivity type such as Si, Ge and Sn. For example, the second semiconductor layer 32 may be n-GaN doped with n-type Si. The thickness Tsem2 of the second semiconductor layer 32 may range from about 2 μm to 4 about μm.

The partition wall PW may be spaced apart from the light-emitting elements LE1 to LE4 located in the first to fourth emission areas EA1 to EA4, respectively. The partition wall PW may surround the light-emitting elements LE1 to LE4 located in the first to fourth emission areas EA1 to EA4, respectively.

The partition wall PW may be located on the common connection electrode CCE. The width of the partition wall PW in the first direction DR1 and the second direction DR2 may be less than the width of the common connection electrode CCE. The partition wall PW may be spaced apart from the light-emitting elements LE.

The partition wall PW may include a first partition wall PW1, a second partition wall PW2, and a third partition wall PW3. The first partition wall PW1 may be located on the first insulating layer INS1. Because the first partition wall PW1 is formed via the same process with the light-emitting element LE, at least a part of the first partition wall PW1 may include the same material as that of the light-emitting element LE.

The second insulating layer INS2 may be located on the side surfaces of the common connection electrode CCE, the side surfaces of the partition wall PW, the side surfaces of each of the pixel electrodes 214, the side surfaces of each of the connection electrodes 213, and the side surfaces of each of light-emitting elements LE1 to LE4. The second insulating layer INS2 may be implemented as an inorganic layer such as a silicon oxide layer ($SiO_2$). The thickness of the second insulating layer INS2 may be about 0.1 μm.

The common electrode CE may be located on the upper and side surfaces of each of the light-emitting elements LE1 to LE4, and the upper and side surfaces of the partition wall PW. That is to say, the common electrode CE may be located to cover the upper and side surfaces of each of the light-emitting elements LE1 to LE4 and the upper and side surfaces of the partition wall PW.

The common electrode CE may be in contact with the second insulating layer INS2 located on the side surfaces of the common connection electrode CCE, the side surfaces of the partition wall PW, the side surfaces of each of the pixel electrodes 214, the side surfaces of each of the connection electrodes 213, and the side surfaces of each of light-emitting elements LE1 to LE4. In addition, the common electrode CE may be in contact with the upper surface of the common connection electrode CCE, the upper surface of each of the light-emitting elements LE1 to LE4, and the upper surface of the partition wall PW.

The common electrode CE may be in contact with the upper surface of the common connection electrode CCE and the upper surfaces of the light-emitting elements LE1 to LE4 that are not covered by the second insulating layer INS2. Therefore, the common voltage supplied to the common connection electrode CCE may be applied to the light-emitting elements LE1 to LE4. That is to say, a first end of each of the light-emitting elements LE1 to LE4 may receive the pixel voltage or the anode voltage of the pixel electrode 214 through the connection electrode 213, and a second end thereof may receive the common voltage through the common electrode CE. The light-emitting element LE may emit light with a luminance (e.g., predetermined luminance) according to a voltage difference between the pixel voltage and the common voltage.

The reflective layer RF may be located on side surfaces of the common connection electrode CCE, side surfaces of the partition wall PW, side surfaces of each of the pixel electrodes 214, side surfaces of each of the connection electrodes 213, and side surfaces of each of light-emitting elements LE1 to LE4 (e.g., with the second insulating layer INS2 and the common electrode CE therebetween). The reflective layer RF serves to reflect some of the lights emitted from the light-emitting elements LE1 to LE4 which travel in directions other than the vertical direction. The reflective layer RF may include a metal material having high reflectivity, such as aluminum (Al). The thickness of the reflective layer RF may be about 0.1 μm.

A base resin BRS may be located on a protective layer PTF in each of the light-emitting elements LE1 to LE4. The base resin BRS may include a transparent organic material. The base resin BRS may further include scattering particles for scattering the light of the light-emitting elements LE1 to LE4 in random directions. The scatterers may include metal oxide particles or organic particles.

The light-blocking member BM may be located on the partition wall PW. The light-blocking member BM may include a light-blocking material. The light-blocking member BM may be located between adjacent ones of the emission areas EA1, EA2, EA3, and EA4, and can reduce or prevent color mixing between lights in different wavelength ranges emitted from the light-emitting elements LE1 to LE4 of the emission areas EA1, EA2, EA3, and EA4. In addition, the light-blocking member BM may absorb at least a part of external light incident from the outside on the light-emitting element layer 217 to reduce reflection of the external light. The light-blocking member BM may be located on the partition wall PW, and may be further extended to the emission areas EA1, EA2, EA3, and EA4. That is to say, the width of the light-blocking member BM may be greater than the width of the partition wall PW (e.g., in plan view).

The optical patterns LP may be selectively located on the emission areas EA1, EA2, EA3, and EA4. The optical patterns LP may be located directly on the base resins BRS of the emission areas EA1, EA2, EA3, and EA4, respectively. The optical patterns LP may have a shape that protrudes upward (e.g., toward each optical pattern LP from the light-emitting elements LE1 to LE4). For example, the cross-sectional shape of each of the optical patterns LP may include a lens shape that is convex upward. Each of the optical patterns LP may be located on the base resin BRS thereunder and the light-blocking member BM. The width of the optical patterns LP may be equal to, greater than, or less than the width of the emission areas EA1, EA2, EA3, and EA4. The optical patterns LP may condense the first to third lights or the fourth light transmitted the base resins BRS in the emission areas EA1, EA2, EA3, and EA4.

Figure 11:
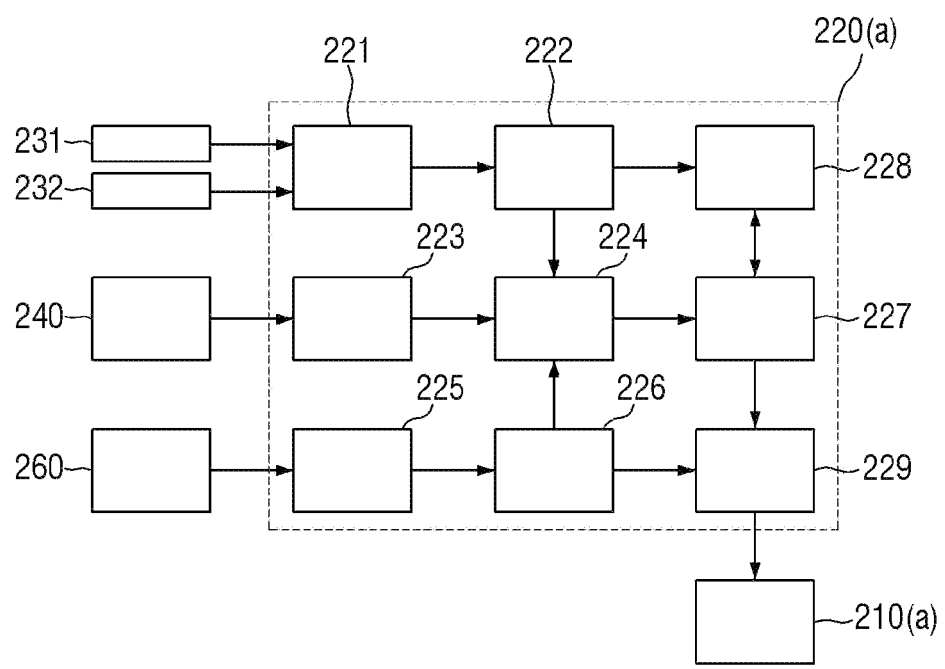
FIG. 11 is a block diagram illustrating elements of the control module shown in FIGS. 2 to 4.

FIG. 11 is a block diagram illustrating elements of the control module shown in FIGS. 2 to 4.

The control module 220(a) shown in FIG. 11 includes a gaze coordinate generator 221, a gaze duration detector 222, a motion detector 223, an image processing controller 224, an image data detector 225, a divided block processor 226, an information detection controller 227, a wireless communication unit 228, and a display controller 229.

The gaze coordinate generator 221 filters the pupil sensing signals received from the first and second biosensors 231 and 232 and performs pre-processing, such as converting them into digital signals. For example, the gaze coordinate generator 221 detects the user's gaze coordinate information Pu (see FIG. 1) based on the matrix arrangement structure of the infrared sensors and the optical image sensors located in the first and second biosensors 231 and 232, the infrared reception positions of the optical image sensors, and the analysis results of the movement of the pupil sensing signals.

The gaze duration detector 222 stores and compares the gaze coordinate information Pu detected by the gaze coordinate generator 221 at a period (e.g., predetermined period), to count the gaze duration in which the gaze coordinate information Pu is not changed but remains constant.

The image processing controller 224 transmits an image data detection signal to the image data detector 225 when the gaze duration counted by the gaze duration detector 222 is equal to or greater than a reference duration (e.g., predetermined reference duration). Then, the user's gaze coordinate information Pu is transmitted to the divided block processor 226.

The image processing controller 224 receives image data of the divided block region corresponding to the user's gaze coordinate information Pu through the divided block processor 226. The image processing controller 224 analyzes the image data of the divided block region to detect information such as an object and a text included in the image of the divided block region. To this end, the image processing controller 224 may perform an image processing program such as edge detection, contrast detection, contour detection, and text filtering. The image processing controller 224 extracts an object or a text information detected from the image data of the divided block regions as the AR content image data, and transmits the extracted object or text information to the display controller 229.

The image processing controller 224 may interrupt generating the image data of the divided block region if the motion information indicating the intention of denial is received through the motion detector 223. On the other hand, the image processing controller 224 may extract detailed information associated with the object or text information detected from the image data of the divided block region if the motion information indicating the intention of approval is received through the motion detector 223. To this end, the image processing controller 224 may transmit the object or text information to the information detection controller 227 so that detailed information related to the object or text information can be retrieved and received through the information detection controller 227.

The image processing controller 224 may transmit the detailed information retrieved and extracted through the information detection controller 227 to the display controller 229, and may control the display controller 229 so that the detailed information related to the object or text can be modulated into AR content image data.

The motion detector 223 receives the sensing signals from the sensing module 240 including the tilt sensor, the gyro sensor, etc., and filters the sensing signals, and also performs pre-processing such as converting them into digital signals. The motion detector 223 detects the information on the moving direction of the device 200 (e.g., the motion information) based on changes in the preprocessed tilt sensing signal, motion speed signal, and motion direction signals. The motion detector 223 may detect a head shake motion based on changes in the preprocessed tilt sensing signal, the moving speed signal, and the moving direction signals, and may transmit a motion signal indicating the intention of denial to the image processing controller 224 if the head shake motion is detected. The motion detector 223 may detect a head nod motion, and may transmit a motion signal indicating the intention of approval to the image processing controller 224 if the head nod motion is detected. On the other hand, the motion detector 223 may receive the pupil sensing signals in real time through the gaze coordinate generator 221, may check the user's eye blink based on the reception period and the non-reception period of the pupil sensing signals, and may transmit a motion signal indicating the intention of approval by the eye blinking to the image processing controller 224.

When an image data detection signal is input, the image data detector 225 receives image data from the image sensor 260 at least per frame, and arranges and stores the image data at least frame by frame. Then, the image data at least per frame is transmitted to the divided block processor 226.

The divided block processor divides the image data in the user gaze direction input through the image data detector 225 at least per frame into a plurality of block regions (e.g., predetermined block regions). Then, image data of one of the divided block regions that corresponds to the gaze coordinate information Pu is extracted and detected. The image data of the divided block region corresponding to the gaze coordinate information Pu is transmitted to the image processing controller 224 in real time.

When the object or text information included in the image data of the divided block region is input through the image processing controller 224, the information detection controller 227 transmits the object or text information to an external database server through the wireless communication unit 228. For example, the information detection controller 227 is connected to an external data server through the wireless communication unit 228 to retrieve and extract the detailed information related to the object or text information through a search engine or a search program. The detailed information related to the object or text information is shared with the image processing controller 224 and the display controller 229 in real time.

The wireless communication unit 228 may include a short-range wireless communication module such as Wi-Fi® and Bluetooth® (Wi-Fi® being a registered trademark of the non-profit Wi-Fi Alliance, and BLUETOOTH® being a registered trademark of Bluetooth Sig, Inc., Kirkland, WA) to perform wireless communications with an external database server through a wireless communication terminal device, such as a smart phone. Alternatively, the wireless communication unit 228 may include a long-range wireless communication module, such as LTE and 5G, to perform wireless communications with an external database server.

The display controller 229 converts the detailed information related to the object or text extracted through the information detection controller 227 into AR content image data to modulate it, and transmits the modulated AR content image data to the at least one display module 210(a) and 210(b). The display controller 229 modulates the image data by adding a border line of a corresponding color to the image of the detailed information, or by putting the image of the detailed information on a background image of a corresponding color so that the detailed information related to the object or text is clearly distinguished from the real world image.

Figure 12:
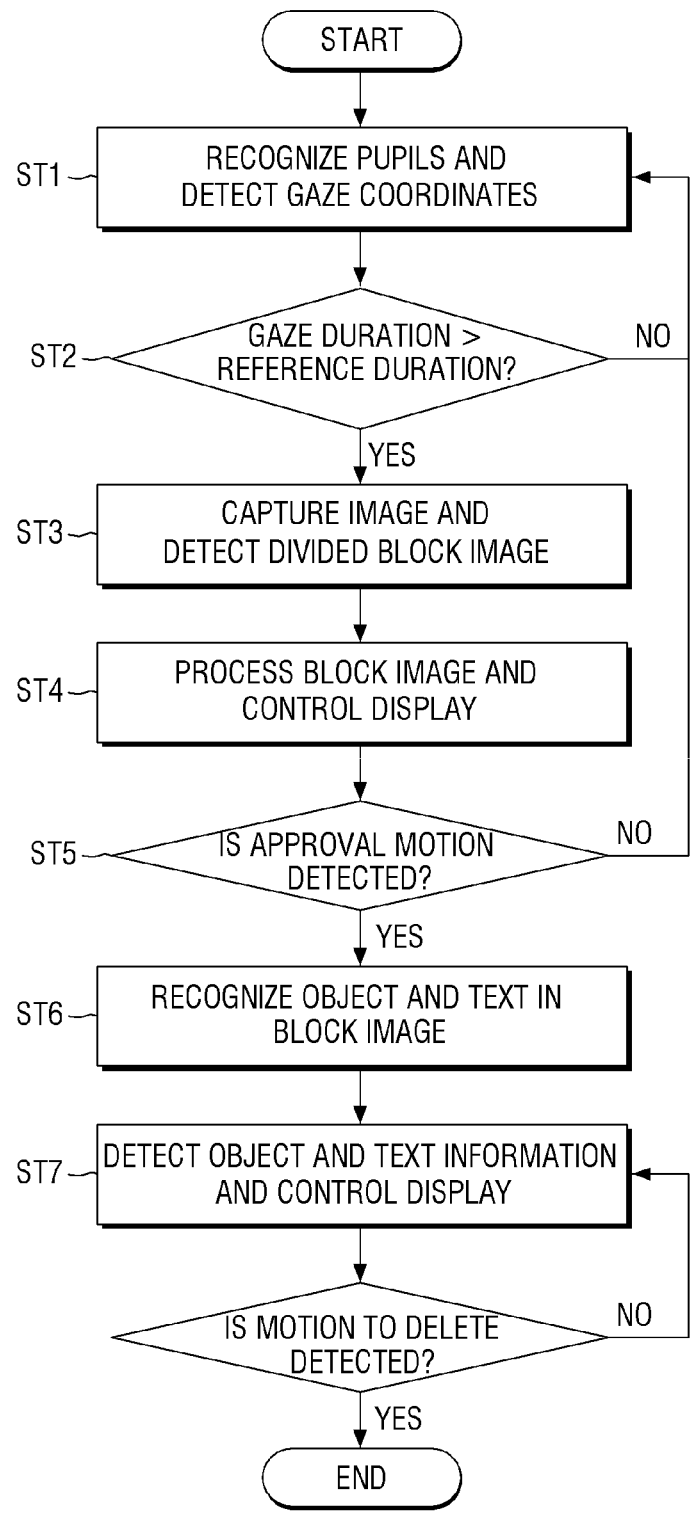
FIG. 12 is a flowchart for illustrating a method of generating an AR content image and displaying related information by a device for providing AR according to one or more embodiments.
Figure 13:
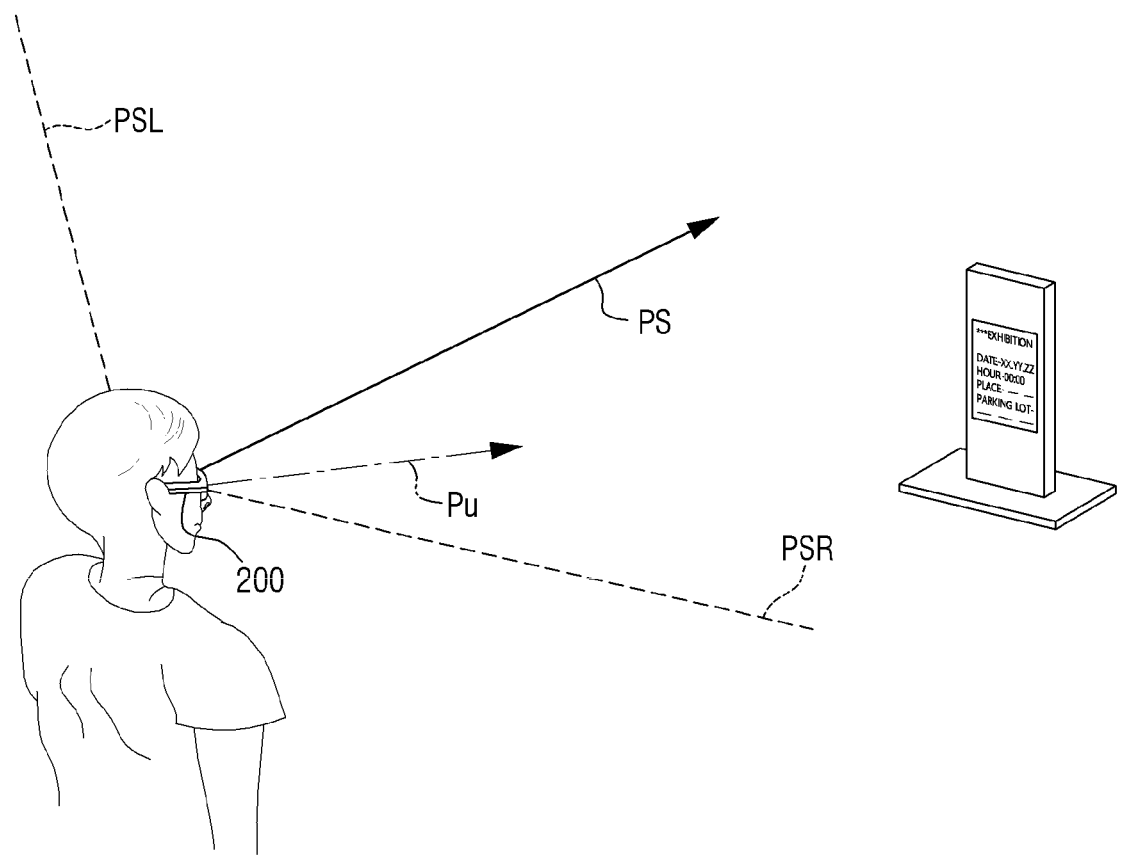
FIG. 13 is a view for illustrating a method of recognizing a user gaze direction and a gaze position using the device for providing AR according to one or more embodiments of the present disclosure.

FIG. 12 is a flowchart for illustrating a method of generating an AR content image and displaying related information by a device for providing AR according to one or more embodiments. FIG. 13 is a view for illustrating a method of recognizing a user gaze direction and a gaze position using the device for providing AR according to one or more embodiments of the present disclosure.

Referring to FIGS. 12 and 13, while wearing the device 200, a user may gaze at an object or a text, such as a billboard, a tree and a flower, within the viewing angle PSL to PSR in the left and right and up and down directions. Accordingly, the gaze coordinate generator 221 analyzes pupil sensing signals received from the first and second biosensors 231 and 232, the matrix arrangement structure of infrared sensors and optical image sensors located in the first and second biosensors 231 and 232, and infrared reception positions of the optical image sensors (pupil reflection infrared reception position). The coordinate generator 221 divides the range of the viewing angle PSL to PSR in the left and right and up and down directions into a plurality of coordinates based on a front direction point PS of the device 200. In addition, the user's gaze coordinate information Pu may be detected based on the position of the pupil reflection infrared reception of the optical image sensors and the positions of the plurality of coordinates (operation ST1 of FIG. 12). The method of detecting the gaze coordinate information Pu according to one or more embodiments of the present disclosure is not limited thereto. The method may be implemented as a variety of algorithms such as pupil detection and pupil tracking.

If the gaze coordinate information Pu is received through the gaze coordinate generator, the gaze duration detector 222 stores and sequentially compares the gaze coordinate information Pu at a period (e.g., predetermined period). Then, the gaze duration detector 222 counts a gaze duration in which the gaze coordinate information Pu is not changed but remains constant based on the comparison results, and the count information is transmitted to the image processing controller 224. Accordingly, if the gaze duration counted by the gaze duration detector 222 is equal to or greater than the reference duration (e.g., predetermined reference duration), the image processing controller 224 determines a corresponding object or text at which the user gazes. The image processing controller 224 transmits an image data detection signal to the image data detector 225 if the gaze duration exceeds the reference duration (e.g., predetermined reference duration), and transmits the user's gaze coordinate information Pu to the divided block processor 226 (operation ST2 in FIG. 12).

Figure 14:
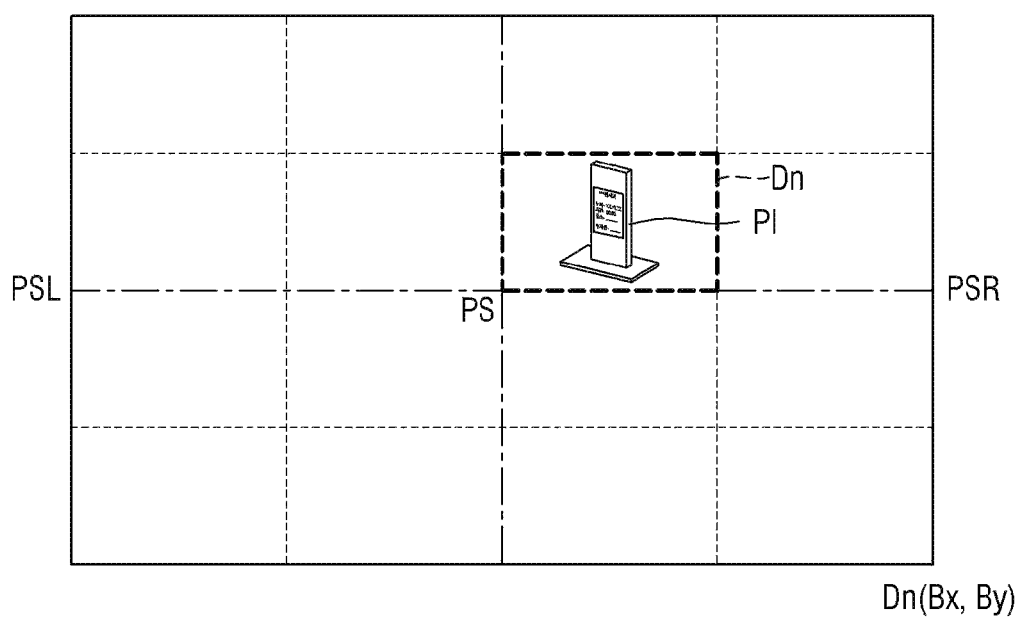
FIG. 14 is a view showing a method of recognizing a user's gaze direction and gaze position by pupil tracking and image analysis according to one or more embodiments.

FIG. 14 is a view showing a method of recognizing a user's gaze direction and gaze position by pupil tracking and image analysis according to one or more embodiments.

Referring to FIGS. 12 and 14, when an image data detection signal is input, the image data detector 225 receives image data from the image sensor 260 (e.g., at least once per frame), and transmits the image data (e.g., at least once per frame) to the divided block processor 226.

Figure 15:
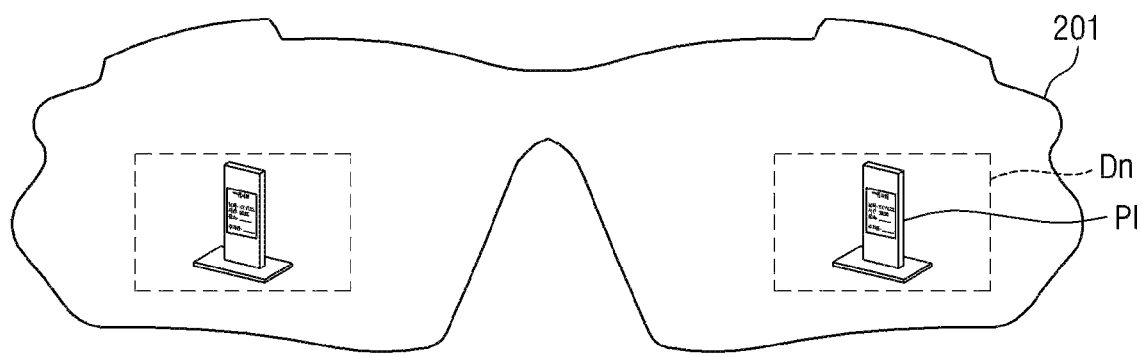
FIG. 15 is a view illustrating a method of displaying an object in a user gaze direction and a block image according to one or more embodiments.

The divided block processor 226 divides the image data in the user gaze direction input through the image data detector 225 (e.g., at least once per frame) into a plurality of block regions (e.g., predetermined block regions) Dn(Bx, By) (see FIG. 15). Then, image data of the block region Dn among the divided block regions that corresponds to the gaze coordinate information Pu is extracted and detected. The image data of the divided block region corresponding to the gaze coordinate information Pu is transmitted to the image processing controller 224 in real time (operation ST3 of FIG. 12).

FIG. 15 is a view illustrating a method of displaying an object in a user gaze direction and a block image according to one or more embodiments.

Referring to FIGS. 12 and 15, the image processing controller 224 extracts object PI or text information detected from the image data of the divided block region Dn as AR content image data, and transmits it to display controller 229.

Accordingly, the display controller 229 converts the detailed information related to the object PI or text detected from the image data of the divided block region Dn into AR content image data to modulate it, and transmits the modulated AR content image data to the at least one display module 210(a) and 210(b). At this time, the display controller 229 may modulate the image data so that the border line of a corresponding color is added to the image of the object PI or text information to clearly distinguish the object PI or text information detected from the image data of the divided block region Dn from the rear world image. Alternatively, the image data may be modulated so that the image of the object PI or text information is displayed in the background image of a corresponding color and output it to the at least one display module 210(a) and 210(b) (operation ST4 of FIG. 12).

Figure 16:
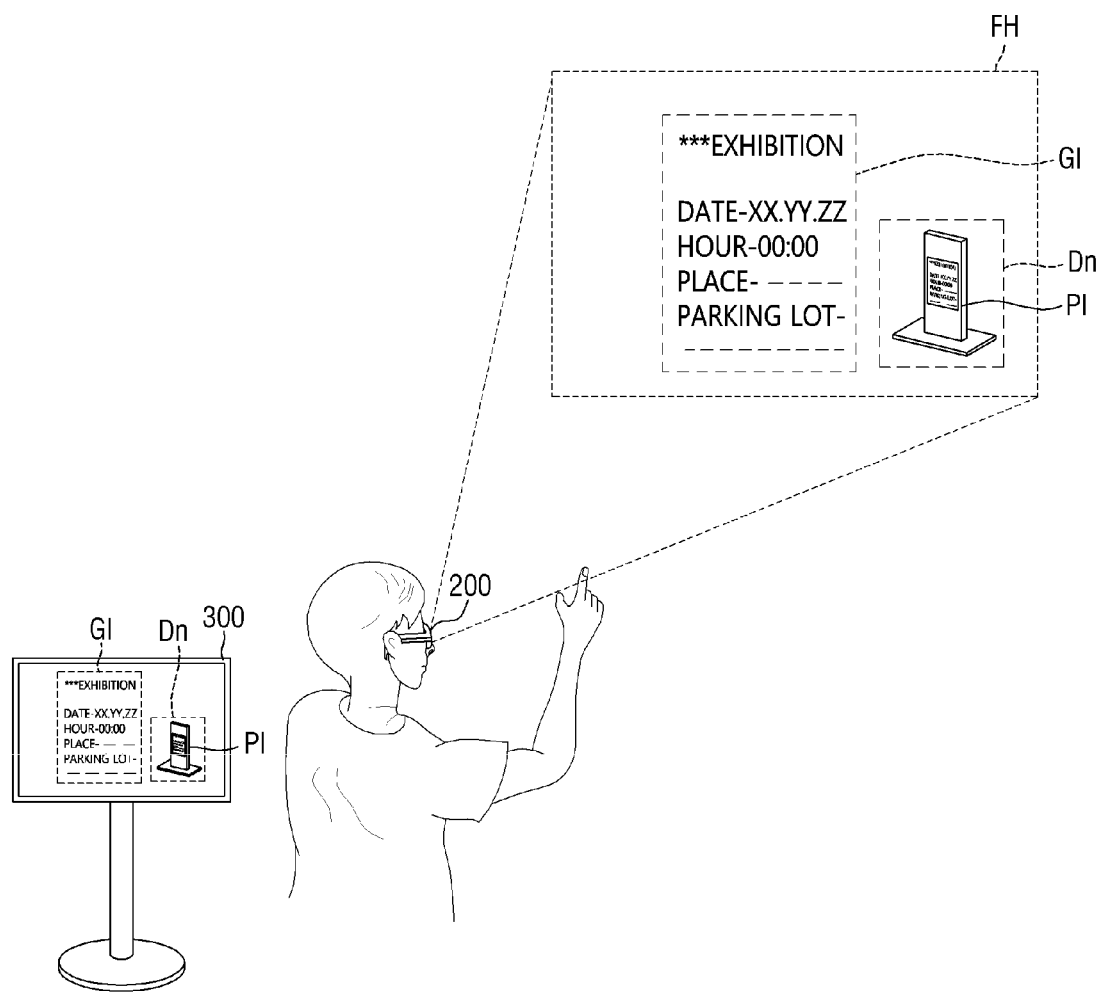
FIG. 16 is a view for illustrating a method of generating and displaying AR content through a system for providing AR according to one or more embodiments.
Figure 17:
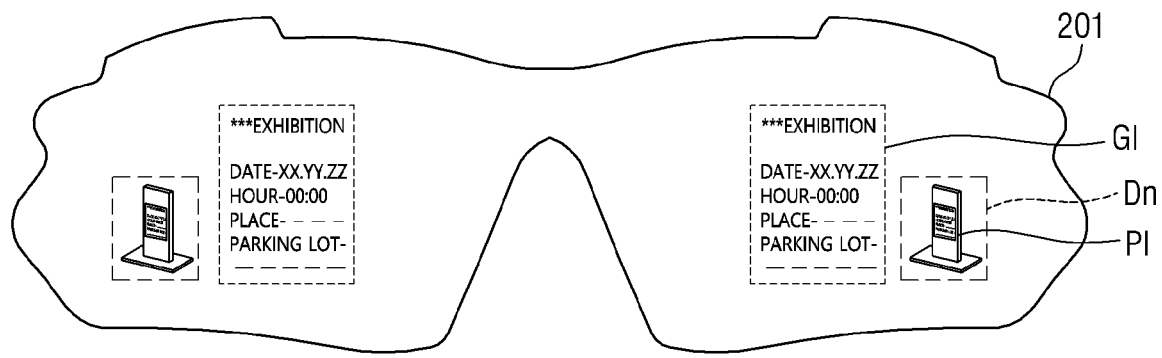
FIG. 17 is a view illustrating a method of displaying information related to an object or a text at which a user gazes according to one or more embodiments.

FIG. 16 is a view for illustrating a method of generating and displaying AR content through a system for providing AR according to one or more embodiments. FIG. 17 is a view illustrating a method of displaying information related to an object or a text at which a user gazes according to one or more embodiments.

Referring to FIGS. 16 and 17, the at least one display module 210(a) and 210(b) displays an image of object PI or text information to which a border line of a corresponding color is added, and allows the display image to be displayed on the transparent lens 201 as well. In addition, the at least one display module 210(a) and 210(b) displays an image of object PI or text information within the background image of a corresponding color, and allows the display image to be displayed on the transparent lens 201 as well.

The motion detector 223 detects a head shake motion based on changes in the tilt sensing signal, the moving speed signal, and the moving direction signals, and may transmit a motion signal indicating the intention of denial to the image processing controller 224 if the head shake motion is detected (NO in operation ST5 of FIG. 12). When this happens, the image processing controller 224 may interrupt generating the image data of the divided block region as the motion information indicating the intention of denial is received through the motion detector 223.

On the other hand, the motion detector 223 may detect an eye blinking motion, and may transmit a motion signal indicating the intention of approval to the image processing controller 224 if the eye blinking motion is detected (YES in operation ST5 of FIG. 12).

The image processing controller 224 may detect the object or text information detected from the image data of the divided block region as the motion information indicating the intention of approval is received through the motion detector 223. For example, the display controller 229 performs the image processing program on the divided block region Dn corresponding to the pupil gaze coordinate information Pu, such as detecting gradation or luminance difference between pixels, edge detection, contrast detection, contour detection, and text filtering. Then, according to the image processing results, the object PI or text included in the image data of the divided block region Dn may be detected. The image processing controller 224 transmits the detected object or text information to the information detection controller 227 (operation ST6 of FIG. 12).

When the object or text information included in the image data of the divided block region is input through the image processing controller 224, the information detection controller 227 transmits the object or text information to an external database server through the wireless communication unit 228. At this time, the information detection controller 227 retrieves and extracts detailed information related to the object or text information through a search engine or a search program, and transmits the extracted, detailed information related to the object or text information to the display controller 229 (operation ST7 in FIG. 12).

The display controller 229 converts the detailed information related to the object or text extracted through the information detection controller 227 into AR content image data to modulate it, and transmits the modulated AR content image data to the at least one display module 210(a) and 210(b).

The display controller 229 modulates the image data so that a border line of a corresponding color is added to the image of the detailed information, or so that the image of the detailed information is displayed in a background image of a corresponding color, and transmits the modulated image data to the at least one display module 210(a) and 210(b).

The image processing controller 224 may transmit the image data of the detailed information modulated from the display controller 229 to at least one external contents display device 300 through the wireless communication unit 228. In this manner, the detailed information related to the object or text extracted through the information detection controller 227 may be displayed equally on at least one other contents display device 300 such as a tablet personal computer (PC).

The at least one contents display device 300 may display AR contents shared with, and received from, the device 200, for example, an AR content image on the screen. The at least one contents display device 300 allows the detailed information related to the object or text at which the user gazes as the AR content image on the screen.

The at least one contents display device 300 may be applied to tablet mobile communications devices, such as smartphone and a tablet PC, a personal digital assistant (PDA), a portable multimedia player (PMP), a television set, a game machine, a wristwatch-type electronic device, a head-mounted display, a monitor of a personal computer, a laptop computer, flat-panel video display device, a car navigation system, a car instrument cluster, a digital camera, a camcorder, an outdoor billboard, an electronic billboard, a medical apparatus, a test device, various home appliances such as a refrigerator and a laundry machine, Internet of things (IoT) devices, etc. Herein, a flat-panel video display device used for learning or lectures is described as an example of the contents display device 300. The flat-panel video display device may have a high resolution or ultra-high resolution such as HD, UHD, 4K, and 8K.

The flat-panel video display device used as the at least one contents display device 300 may be sorted by the display manner into an organic light-emitting display device (OLED), an inorganic light-emitting display device (inorganic EL), a quantum-dot light-emitting display device (QED), a micro LED display device (micro-LED), a nano LED display device (nano-LED), a plasma display device (PDP), a field emission display device (FED), a cathode ray display device (CRT), a liquid-crystal display device (LCD), an electrophoretic display device (EPD), etc. In the following description, a micro LED display device will be described as an example of the contents display device 300. The micro LED display device will be simply referred to as a display device unless it is necessary to discern them. It should be understood, however, that the embodiments of the present disclosure are not limited to the micro LED display devices, and any other contents display device listed above or well known in the art may be employed without departing from the scope of the present disclosure.

Subsequently, the image processing controller 224 may interrupt the displaying operation of the detailed information associated with the object or text as the motion information indicating the intention to delete, such as head nod is received. The image processing controller 224 may interrupt displaying and sharing the detailed information on the object or text as well as the AR content image if the motion information indicating the intention to delete is received after the AR content images are displayed (operation ST8 of FIG. 12).

Figure 18:
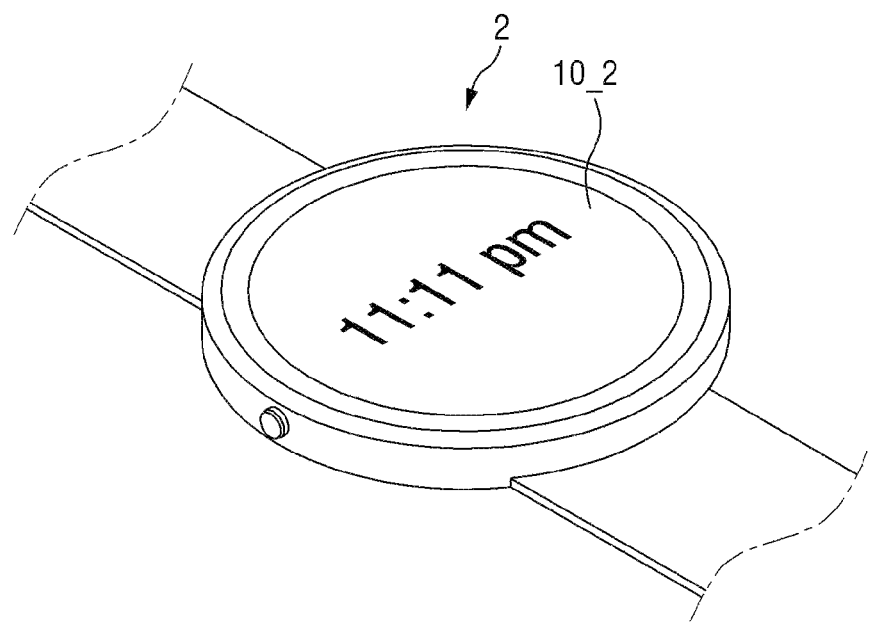
FIG. 18 is a view showing an example of a watch-type smart device including a display module according to one or more embodiments of the present disclosure.

FIG. 18 is a view showing an example of a watch-type smart device including a display module according to one or more embodiments of the present disclosure.

Referring to FIG. 18, the image displayer 110 included in the device 200 may be applied to the watch-type smart device 2, which is one of various smart devices. In addition, the watch-type smart device 2 according to one or more embodiments of the present disclosure may be applied to a head mounted display including a band that can be worn on the head. That is, the watch-type smart device 2 is not limited to that shown in FIG. 18, but may be applied in a variety of electronic devices in a variety of forms.

Figure 19:
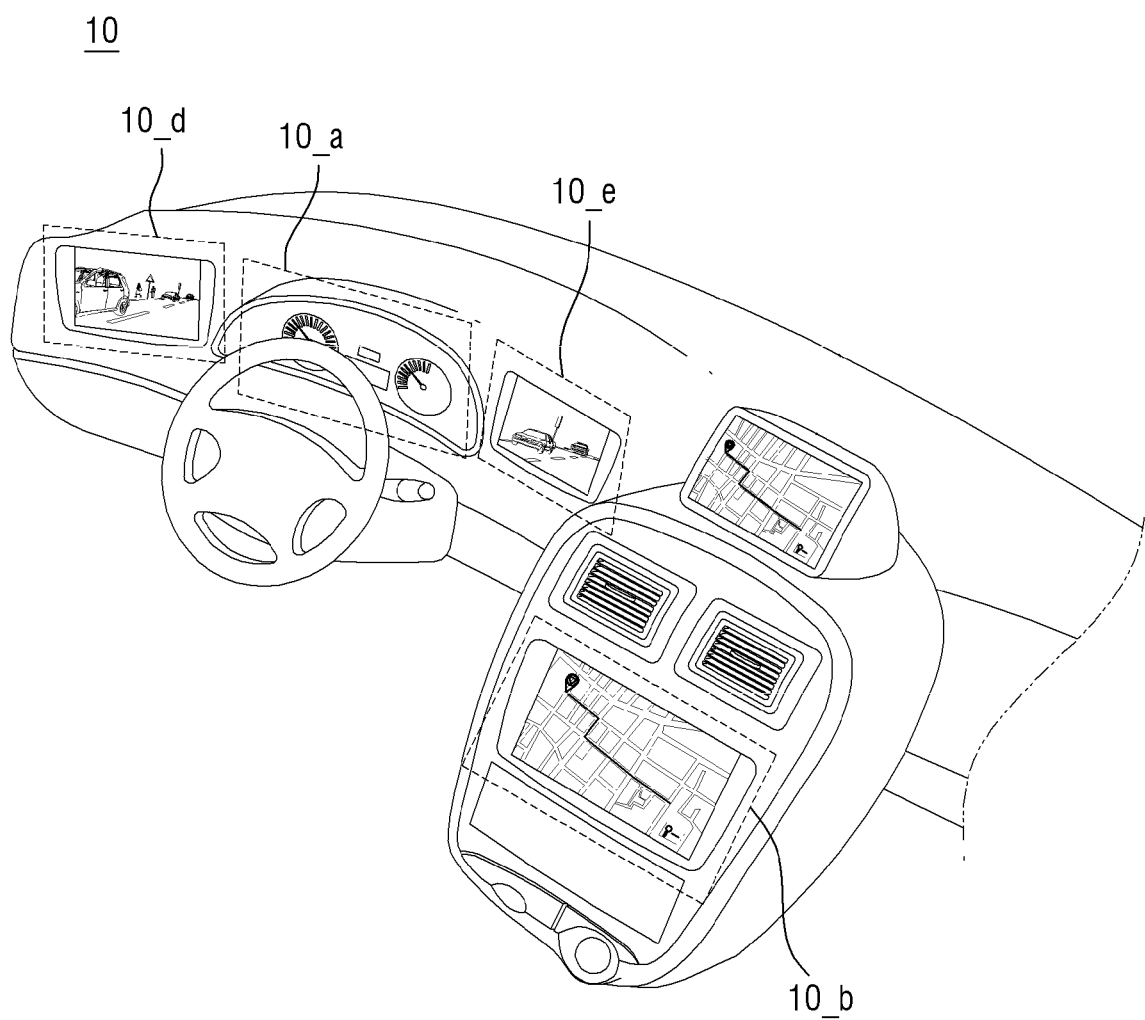
FIG. 19 is a view showing an example of an instrument cluster and a center fascia for a vehicle which include display modules according to one or more embodiments.

FIG. 19 is a view showing an example of an instrument cluster and a center fascia for a vehicle which includes display modules according to one or more embodiments.

Referring to FIG. 19, the image displayer 110 including in the device 200 may be applied to the instrument cluster 10_a of a vehicle, may be applied to the center fascia 10_b of a vehicle, or may be applied to a center information display (CID) 10_d and 10_e located on the dashboard of a vehicle. In addition, the image displayer 110 according to one or more embodiments of the present disclosure may be applied to room mirror displays 10_d and 10_e, which can replace side mirrors of a vehicle, a navigation device, etc.

Figure 20:
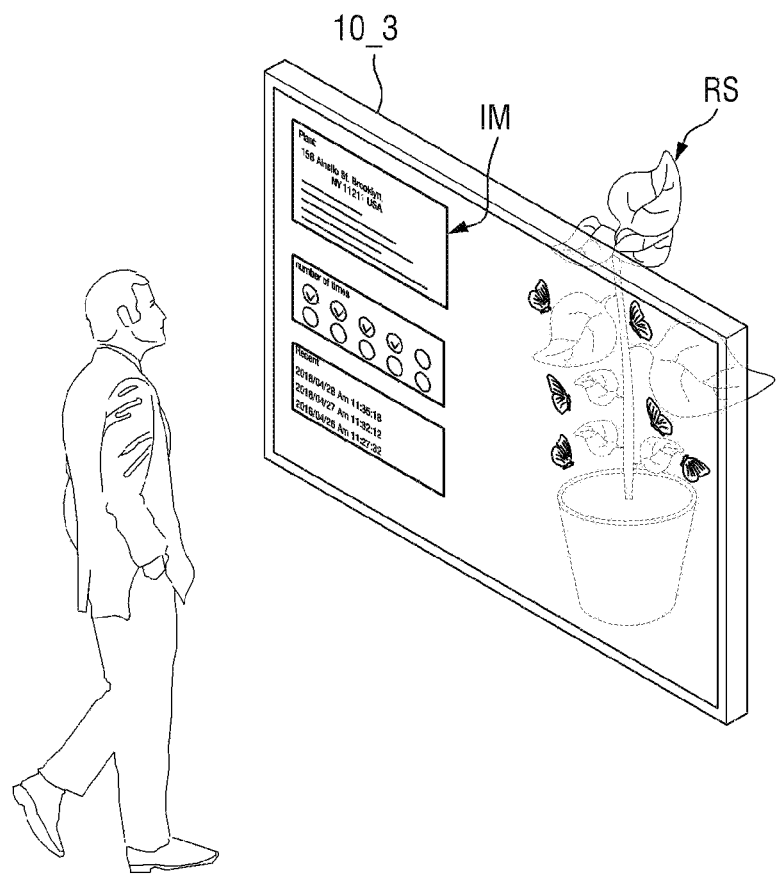
FIG. 20 is a view showing an example of a transparent display device including a display module according to one or more embodiments.

FIG. 20 is a view showing an example of a transparent display device including a display module according to one or more embodiments.

Referring to FIG. 20, the image displayer 110 included in the device 200 may be applied to a transparent display device. The transparent display device may transmit light while displaying images IM. Therefore, a user located in front of the front side of the transparent display device may watch not only the images IM displayed on the image displayer 110, but also may watch an object RS or the background located behind the rear side of the transparent display device. When the image displayer 110 is applied to the transparent display device, the display panel 212 of the image displayer 110 may include a light-transmitting portion that can transmit light, or may be made of a material that can transmit light.

Although the embodiments of the present disclosure have been described with reference to the accompanying drawings, those skilled in the art would understand that various modifications and alterations may be made without departing from the technical idea or essential features of the present disclosure. Therefore, it should be understood that the above-mentioned embodiments are not limiting but illustrative in all aspects.

In concluding the detailed description, those skilled in the art will appreciate that many variations and modifications can be made to the preferred embodiments without substantially departing from the aspects of the present disclosure. Therefore, the disclosed preferred embodiments of the invention are used in a generic and descriptive sense only and not for purposes of limitation.

What is claimed is:

1. A device for providing augmented reality (AR), the device comprising:
    at least one display module configured to display an AR content image through a transparent lens;
    a sensing module configured to generate signals indicative of movement in left, right, up, and down directions, and to generate image data corresponding to a user's gaze direction;
    a biosensor configured to detect a user's pupil to output a pupil sensing signal; and
    a control module configured to detect gaze coordinate information based on the pupil sensing signal, and to extract an object, and to extract a text, corresponding to the gaze coordinate information from the image data to generate AR content data comprising the extracted object or text.

2. The device of claim 1, wherein the control module is further configured to:
    provide the AR content data to the at least one display module when the gaze coordinate information is constant for a period; and
    interrupt displaying the AR content image when a motion signal indicating an intention of denial is received.

3. The device of claim 2, wherein the control module is further configured to:
    retrieve and store information related to the extracted object or text when a motion signal indicating an intention of approval is received;
    generate the AR content data so that the retrieved information is displayed in the AR content image; and
    share the AR content data with another content display device.

4. The device of claim 3, wherein the control module is further configured to interrupt sharing of the AR content data when the motion signal indicating the intention of denial is received after the AR content image is displayed.

5. The device of claim 1, wherein the control module comprises:
    a gaze coordinate generator configured to analyze the pupil sensing signal to detect the user's gaze coordinate information;
    a gaze duration detector configured to determine a gaze duration in which the gaze coordinate information is sustained;
    an image processing controller configured to transmit an image data detection signal and the gaze coordinate information when the gaze duration is equal to or greater than a reference duration;
    an image data detector configured to extract image data corresponding to the user's gaze direction through an image sensor of the sensing module in response to the image data detection signal; and
    a divided block processor configured to divide the image data into block regions, and to extract block image data of a block region corresponding to the gaze coordinate information from among the block regions.

6. The device of claim 5, wherein the control module further comprises a motion detector configured to:
    detect a motion in a left direction or a right direction;
    transmit a motion signal indicating an intention of denial or a motion signal indicating an intention of approval to the image processing controller; and
    transmit, to the image processing controller, a motion signal indicating an intention to delete depending on whether the pupil sensing signal is received.

7. The device of claim 5, wherein the image processing controller is configured to:
    perform at least one image processing program of edge detection, contrast detection, contour detection, or text filtering to extract object or text information included in an image of the block region; and
    transmit the AR content data comprising the extracted object or text information to a display controller and an information detection controller.

8. The device of claim 7, wherein the information detection controller is configured to:
    transmit the object or text information to an external database server through a wireless communication unit;
    retrieve and extract information related to the object or text information through a search engine or a search program; and
    share the information with the image processing controller.

9. The device of claim 8, wherein the display controller is configured to:

modulate the AR content data so that a border line of a color is added to an image corresponding to the information, or so that the image corresponding to the information is displayed in a background image of a corresponding color; and transmit the modulated AR content data to the at least one display module.

10. The device of claim 1, wherein the at least one display module is assembled on one or more sides of a support frame for supporting the transparent lens, or is formed integrally with the support frame, and is configured to display the AR content image through an image transmission member and one or more reflective members.

11. The device of claim 1, wherein the at least one display module comprises at least one image displayer configured to display the AR content image, and at least one optical member among at least one diffusing lens, at least one focusing lens, a refractive lens, and an optical waveguide for changing a display path of the AR content image.

12. The device of claim 11, wherein the at least one image displayer comprises:
a partition wall on a substrate;
light-emitting elements in respective emission areas arranged in an RGBG matrix by partitions of the partition wall, and extending in a thickness direction of the substrate;
a base resin formed in the emission areas; and
optical patterns located on at least one of the emission areas.

13. The device of claim 12, wherein first to third or fourth emission areas of the emission areas are arranged in the an RGBG matrix in each pixel area.

14. The device of claim 13, wherein the first emission area comprises a first light-emitting element configured to emit a first light of red, green, or blue,
wherein the second emission area comprises a second light-emitting element configured to emit a second light having of red, green, or blue and different from the first light,
wherein the third emission area comprises a third light-emitting element configured to emit a third light of red, green, or blue and different from the first light and the second light, and
wherein the fourth emission area comprises a fourth light-emitting element configured to emit a fourth light that is the same as one of the first to third lights.

15. The device of claim 13, wherein the first to fourth emission areas have a same size or area when viewed from top, and
wherein a distance between the first emission area and the second emission area, a distance between the second emission area and the third emission area, a distance between the first emission area and the third emission area, and a distance between the third emission area and the fourth emission area, which are adjacent to each other in a horizontal or diagonal direction, are equal.

16. The device of claim 13, wherein the first to fourth emission areas have different sizes or areas in plan view, and
wherein a distance between the first emission area and the second emission area, a distance between the second emission area and the third emission area, a distance between the first emission area and the third emission area, and a distance between the third emission area and the fourth emission area are equal or different depending on the size or area of each of the first to fourth emission areas.

17. A system for providing augmented reality (AR), the system comprising:
a device for providing AR that is configured to extract an object, and to extract a text, from image data of an image captured by the system, and corresponding to a user's gaze coordinate information, and to display the extracted object or text as an AR content image;
a database server configured to supply information related to the extracted object or text to the device for providing AR; and
at least one content display device configured to receive the AR content image from the device for providing AR to equally display it.

18. The system of claim 17, wherein the device for providing AR comprises:
a support frame for supporting at least one transparent lens;
at least one display module for displaying an AR content image through at least one transparent lens;
a sensing module mounted on the support frame to generate signals indicative of movement in left, right, up, and down directions, and to generate the image data corresponding to the user's gaze direction;
first and second biometric sensors for detecting a user's pupil who wears the support frame to output a pupil sensing signal; and
a control module configured to detect the user's gaze coordinate information based on the pupil sensing signal, and configured to generate AR content data so that the extracted object or text is displayed as the AR content image.

19. The system of claim 18, wherein the at least one display module comprises at least one image displayer configured to display the AR content image, and at least one optical member among at least one diffusing lens, at least one focusing lens, a refractive lens, and an optical waveguide for changing a display path of the AR content image.

20. The system of claim 18, wherein the control module is configured to:
retrieve and store the information related to the extracted object or text through the database server;
generate the AR content data so that the information retrieved from the database server is additionally displayed as the AR content image; and
share AR content data with the at least one content display device.

* * * * *